(12) United States Patent
Takeda

(10) Patent No.: US 8,952,994 B2
(45) Date of Patent: Feb. 10, 2015

(54) INFORMATION PROCESSING DEVICE, CONTROL METHOD FOR INFORMATION PROCESSING DEVICE, PROGRAM, AND INFORMATION STORAGE MEDIUM

(75) Inventor: Seiichi Takeda, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 13/819,937

(22) PCT Filed: Jun. 29, 2012

(86) PCT No.: PCT/JP2012/066807
§ 371 (c)(1),
(2), (4) Date: Feb. 28, 2013

(87) PCT Pub. No.: WO2013/031373
PCT Pub. Date: Mar. 7, 2013

(65) Prior Publication Data
US 2013/0241957 A1    Sep. 19, 2013

(30) Foreign Application Priority Data
Aug. 31, 2011   (JP) ................. 2011-190121

(51) Int. Cl.
*G06F 3/0482* (2013.01)
*G06T 3/00* (2006.01)
(Continued)

(52) U.S. Cl.
CPC .............. *G06T 3/00* (2013.01); *G06Q 30/0629* (2013.01); *G06F 3/0482* (2013.01); *G06F 3/0486* (2013.01); *G06F 3/04883* (2013.01); *G06Q 30/0623* (2013.01)
USPC .......................................... 345/676; 345/681

(58) Field of Classification Search
CPC . G06F 3/0482; G06F 3/0486; G06F 3/04883; G06Q 30/0623; G06Q 30/0629; G06T 3/00
USPC ........................................................ 345/676
See application file for complete search history.

(56) References Cited

U.S. PATENT DOCUMENTS 5,821,933 A   10/1998 Keller et al.
2007/0262964 A1*  11/2007 Zotov et al. ................... 345/173
(Continued)

FOREIGN PATENT DOCUMENTS

EP   2 060 970 A1   5/2009
EP   2 284 674 A2   2/2011
(Continued)

OTHER PUBLICATIONS

Written Opinion dated Oct. 2, 2012 issued in International Patent Application No. PCT/JP2012/066807.
(Continued)

*Primary Examiner* — Mark Zimmerman
*Assistant Examiner* — Sohum Kaji
(74) *Attorney, Agent, or Firm* — Sughrue Mion, PLLC

(57) ABSTRACT

To provide an information processing device capable of enhancing convenience of a user using the information processing device by considering a dominant hand, habit, or the like, of the user without imposing on the user a task of inputting information of the user's dominant hand, habit, the like. In a case where it is determined that a user's designated position is included in a determination area corresponding to an object, the object is moved in accordance with movement of the designated position. In a case where at least one of one object and another object moves, processing relevant to the objects is executed based on a result of collision determination executed with respect to the objects. A second processing executing unit (64) executes predetermined processing based on a positional relationship between one object or one designated position and another object or another designated position in a case in the past in which it is determined that the one designated position is included in the determination area corresponding to the one object and the other designated position is included in the determination area corresponding to the other object.

11 Claims, 15 Drawing Sheets

(51) Int. Cl.
*G06Q 30/06* (2012.01)
*G06F 3/0486* (2013.01)
*G06F 3/0488* (2013.01)

(56) References Cited

U.S. PATENT DOCUMENTS

2010/0013780 A1* 1/2010 Ikeda et al. .................. 345/173
2011/0022982 A1  1/2011 Takaoka et al.
2013/0033448 A1  2/2013 Yano et al.

FOREIGN PATENT DOCUMENTS

| | | |
|---|---|---|
| JP | 5-66888 A | 3/1993 |
| JP | 5-189484 A | 7/1993 |
| JP | 9-128208 A | 5/1997 |
| JP | 2009-123208 A | 6/2009 |
| JP | 2011-28534 A | 2/2011 |
| WO | WO03031005 A2 * | 4/2003 |
| WO | 2011/102406 A1 | 8/2011 |

OTHER PUBLICATIONS

Written Opinion for PCT/JP2012/066807 dated Oct. 2, 2012.
International Search Report for PCT/JP2012/066807 dated Oct. 2, 2012.
Extended European Search Report dated Jun. 7, 2013, issued in European Patent Application No. 12824893.7.

* cited by examiner

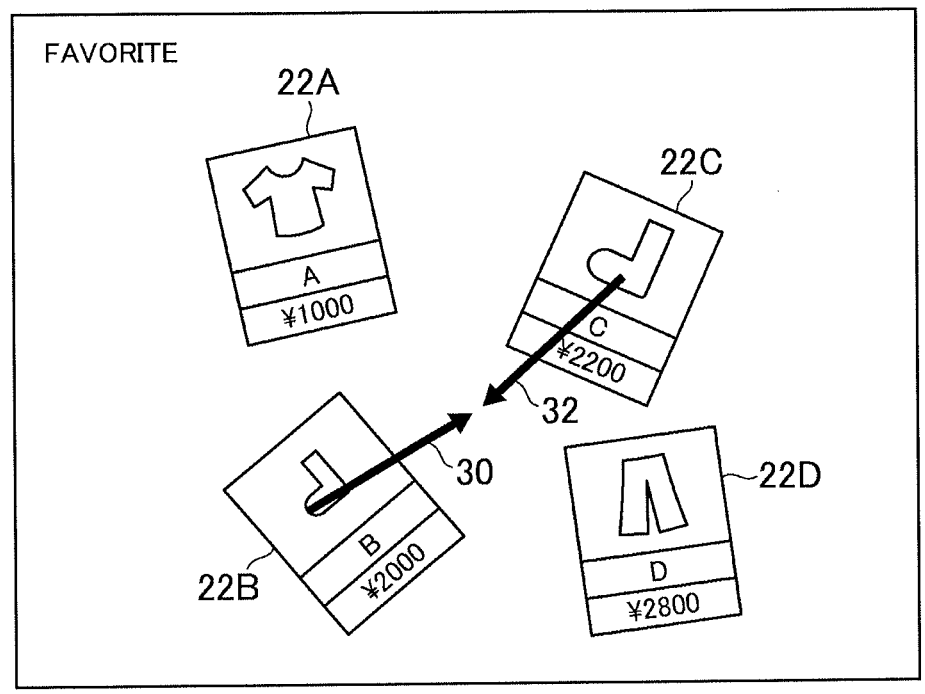

FIG.7

| PRODUCT ID | PRODUCT NAME | PRICE | CATEGORY | RATING SCORE | REGISTRANTS TO FAVORITE | IMAGE | SHOPPING PAGE |
|---|---|---|---|---|---|---|---|
| G0100 | A | 1000 | --- | 3.0 | 10 | --- | --- |
| G0110 | B | 2000 | --- | 4.5 | 50 | --- | --- |
| G0120 | C | 2200 | --- | 4.0 | 36 | --- | --- |
| G0130 | D | 2800 | --- | 4.8 | 80 | --- | --- |

FIG.8

| OBJECT ID | PRODUCT ID | POSITION |
|---|---|---|
| 001 | G0100 | (xa, ya) |
| 002 | G0110 | (xb, yb) |
| 003 | G0120 | (xc, yc) |
| 004 | G0130 | (xd, yd) |

FIG.9

| | DESIGNATED POSITION |
|---|---|
| 1 | (x1, y1) |
| 2 | (x2, y2) |

| DIRECTION INFORMATION |
|---|
| $\vec{V1}$ |
| $\vec{V2}$ |
| $\vec{V3}$ |
| $\vec{V4}$ |
| $\vec{V5}$ |
| ... |

| DIRECTION INFORMATION | DISTANCE INFORMATION |
|---|---|
| $\vec{V1}$ | D1 |
| $\vec{V2}$ | D2 |
| $\vec{V3}$ | D3 |
| $\vec{V4}$ | D4 |
| $\vec{V5}$ | D5 |
| ... | ... |

| DOMINANT HAND | INITIAL DISPLAY POSITION OF PRODUCT IMAGE | |
|---|---|---|
| | ONE PRODUCT IMAGE | OTHER PRODUCT IMAGE |
| RIGHT HAND | AREA B | AREA C |
| LEFT HAND | AREA A | AREA D |

| REFERENCE DIRECTION | INITIAL DISPLAY POSITION OF PRODUCT IMAGE | |
|---|---|---|
| | ONE PRODUCT IMAGE | OTHER PRODUCT IMAGE |
| A | AREA B | AREA C |
| B | AREA A | AREA D |
| C | BOUNDARY A | BOUNDARY D |
| D | BOUNDARY B | BOUNDARY C |

INFORMATION PROCESSING DEVICE, CONTROL METHOD FOR INFORMATION PROCESSING DEVICE, PROGRAM, AND INFORMATION STORAGE MEDIUM

CROSS REFERENCE TO RELATED APPLICATIONS

This application is a National Stage of International Application No. PCT/JP2012/066807, filed on Jun. 29, 2012, which claims priority from Japanese Patent Application No. 2011-190121, filed on Aug. 31, 2011, the contents of all of which are incorporated herein by reference in their entirety.

TECHNICAL FIELD

The present invention relates to an information processing device, a control method for an information processing device, a program, and an information storage medium.

BACKGROUND ART

There has been known a technique for enhancing convenience of a user using an information processing device by considering a dominant hand, habit, or the like, of the user. As such a technique, for example, there has been known a technique for changing the layout of a screen displayed on a display unit of the information processing device, depending on a user's dominant hand. For example, Patent Literature 1 discloses change of a display position of a scroll button displayed in a screen, depending on a user's dominant hand.

CITATION LIST

Patent Literature

Patent Literature 1: JP 5-66888 A

SUMMARY OF INVENTION

Technical Problem

However, according to the information processing device disclosed in Patent Literature 1, for example, a user needs to input information on his/her dominant hand in advance.

The present invention has been conceived in view of the above, and aims to provide an information processing device, a control method for an information processing device, a program, and an information storage medium capable of enhancing convenience of a user using an information processing device by considering the dominant hand, habit, or the like, of the user without imposing on the user a task of inputting information on his/her dominant hand, habit or the like.

Solution to Problem

In order to achieve the above described object, an information processing device according to the present invention includes display control means for displaying a screen including a plurality of objects on display means; detection result obtaining means for obtaining a result of detection by detection means capable of detecting a plurality of positions in the screen designated by a user; determination means for determining whether or not the user's designated position is included in a determination area set based on a position of any object among the plurality of objects; object moving means, in a case where it is determined that the designated position is included in the determination area set based on the position of any object among the plurality of objects, for moving the object in accordance with movement of the designated position; collision determination means, in a case where it is determined that the user's one designated position is included in a determination area set based on a position of one object among the plurality of objects and that the user's another designated position is included in a determination area set based on a position of another object among the plurality of objects, and at least one of the one object and the other object is moved by the objet moving means, for determining whether or not the one object and the other object collide with each other; first processing executing means for executing processing relevant to the one object and the other object based on a result of determination by the collision determination means; and second processing executing means for executing predetermined processing based on positional relationship information on a positional relationship between the one object or the one designated position and the other object or the other designated position in a case in a past in which it is determined that the one designated position is included in the determination area set based on the position of the one object and that the other designated position is included in the determination area set based on the position of the other object.

Further, a control method for an information processing device according to the present invention includes a display control step of displaying a screen including a plurality of objects on display means; a detection result obtaining step of obtaining a result of detection by detection means capable of detecting a plurality of positions in the screen designated by a user; a determination step of determining whether or not the user's designated position is included in a determination area set based on a position of any object among the plurality of objects; an object moving step, in a case where it is determined that the designated position is included in the determination area set based on the position of any object among the plurality of objects, of moving the object in accordance with movement of the designated position; a collision determination step, in a case where it is determined that the user's one designated position is included in a determination area set based on a position of one object among the plurality of objects and that the user's another designated position is included in a determination area set based on a position of another object among the plurality of objects, and at least one of the one object and the other object is moved at the objet moving step, of determining whether or not the one object and the other object collide with each other; a first processing executing step of executing processing relevant to the one object and the other object based on a result of determination at the collision determination step; and a second processing executing step of executing predetermined processing based on positional relationship information on a positional relationship between the one object or the one designated position and the other object or the other designated position in a case in a past in which it is determined that the one designated position is included in the determination area set based on the position of the one object and that the other designated position is included in the determination area set based on the position of the other object.

A program according to the present invention is a program for causing computer to function as display control means for displaying a screen including a plurality of objects on display means; detection result obtaining means for obtaining a result of detection by detection means capable of detecting a plurality of positions in the screen designated by a user; determination means for determining whether or not the user's designated position is included in a determination area set based on a position of any object among the plurality of objects; object moving means, in a case where it is determined that the designated position is included in the determination area set based on the position of any object among the plurality of objects, for moving the object in accordance with movement of the designated position; collision determination means, in a case where it is determined that the user's one designated position is included in a determination area set based on a position of one object among the plurality of objects and that the user's another designated position is included in a determination area set based on a position of another object among the plurality of objects, and at least one of the one object and the other object is moved by the objet moving means, for determining whether or not the one object and the other object collide with each other; first processing executing means for executing processing relevant to the one object and the other object based on a result of determination by the collision determination means; and second processing executing means for executing predetermined processing based on positional relationship information on a positional relationship between the one object or the one designated position and the other object or the other designated position in a case in a past in which it is determined that the one designated position is included in the determination area set based on the position of the one object and that the other designated position is included in the determination area set based on the position of the other object.

An information storage medium according to the present invention is a computer readable information storage medium storing a program for causing a computer to function as display control means for displaying a screen including a plurality of objects on display means; detection result obtaining means for obtaining a result of detection by detection means capable of detecting a plurality of positions in the screen designated by a user; determination means for determining whether or not the user's designated position is included in a determination area set based on a position of any object among the plurality of objects; object moving means, in a case where it is determined that the designated position is included in the determination area set based on the position of any object among the plurality of objects, for moving the object in accordance with movement of the designated position; collision determination means, in a case where it is determined that the user's one designated position is included in a determination area set based on a position of one object among the plurality of objects and that the user's another designated position is included in a determination area set based on a position of another object among the plurality of objects, and at least one of the one object and the other object is moved by the objet moving means, for determining whether or not the one object and the other object collide with each other; first processing executing means for executing processing relevant to the one object and the other object based on a result of determination by the collision determination means; and second processing executing means for executing predetermined processing based on positional relationship information on a positional relationship between the one object or the one designated position and the other object or the other designated position in a case in a past in which it is determined that the one designated position is included in the determination area set based on the position of the one object and that the other designated position is included in the determination area set based on the position of the other object.

In an embodiment of the present invention, the positional relationship may be a positional relationship between the one object or the one designated position and the other object or the other designated position in a case in a past in which it is determined that the one object and the other object collide with each other.

In an embodiment of the present invention, the second processing executing means may include a dominant hand determination means for determining a document hand of the user by executing dominant hand determination processing for determining the dominant hand of the user based on the positional relationship information.

In an embodiment of the present invention, the positional relationship information may include direction information on a direction from the one object or the one designated position to the other object or the other designated position in a case in a past in which it is determined that the one designated position is included in the determination area set based on the position of the one object and the other designated position is included in the determination area set based on the position of the other object, and the dominant hand determination means may determine the dominant hand of the user based on the direction information.

In an embodiment of the present invention, attribute information may be correlated to each of the plurality of objects, and the display control means may include comparing means for comparing attribute information items of two objects among the plurality of objects, and means for setting initial display positions of two objects leading to a result of comparison by the comparing means being a predetermined result, based on a result of determination by the dominant hand determination means.

In an embodiment of the present invention, the information processing device may further include means for storing in storage means information on a combination of two objects that are determined by the collision determination means as having collided with each other in a past, wherein the display control means may include means for setting initial display positions of two objects selected from among the plurality of objects based on at least a part of content stored in the storage means, based on a result of determination by the dominant hand determination means.

In an embodiment of the present invention, the information processing device may further include means for obtaining a list of information satisfying a search condition, and means for displaying a search result screen showing the list of information on the display means, wherein the search condition may be set based on a result of determination by the dominant hand determination means.

In an embodiment of the present invention, the second processing executing means may include initial display position setting means for setting initial display positions of the plurality of objects by executing processing for setting the initial display positions of the plurality of objects based on the positional relationship information.

In an embodiment of the present invention, the positional relationship information may include direction information on a direction from the one object or the one designated position to the other object or the other designated position in a case in a past in which it is determined that the one designated position is included in the determination area set based on the position of the one object and the other designated position is included in the determination area set based on the position of the other object, attribute information may be correlated to each of the plurality of objects, and the initial display position setting means may include comparing means for comparing attribute information items of two objects among the plurality of objects, and means for setting a direction from an initial display position of one of two objects leading to a result of comparison by the comparing means being a predetermined result to an initial display position of the other of the two objects, based on the direction information.

In an embodiment of the present invention, the positional relationship information may include distance information on a distance between the one object or the one designated position and the other object or the other designated position in a case in a past in which it is determined that the one designated position is included in the determination area set based on the position of the one object and the other designated position is included in the determination area set based on the position of the other object, attribute information may be correlated to each of the plurality of objects, and the initial display position setting means may include comparing means for comparing attribute information items of two objects among the plurality of objects, and means for setting a distance between initial display positions of two objects leading to a result of comparison by the comparing means being a predetermined result, based on the distance information.

In an embodiment of the present invention, the positional relationship information may include direction information on a direction from the one object or the one designated position to the other object or the other designated position in a case in a past in which it is determined that the one designated position is included in the determination area set based on the position of the one object and the other designated position is included in the determination area set based on the position of the other object, the information processing device may further includes means for storing in storage means information on a combination of two objects that are determined in a past by the collision determination means as having been collided with each other, and the initial display position setting means may include means for setting a direction from an initial display position of one of two objects selected from among the plurality of objects based on at least a part of content stored in the storage means, to an initial display position of the other of the two objects, based on the direction information.

In an embodiment of the present invention, the positional relationship information may include distance information on a distance between the one object or the one designated position and the other object or the other designated position in a case in a past in which it is determined that the one designated position is included in the determination area set based on the position of the one object and the other designated position is included in the determination area set based on the position of the other object, the information processing device may further include means for storing in storage means information on a combination of two objects that are determined in a past by the collision determination means as having been collided with each other, and the initial display position setting means may include means for setting a distance between initial display positions of two objects selected from among the plurality of objects based on at least a part of content stored in the storage means, based on the distance information.

Advantageous Effects of Invention

According to the present invention, it is possible to enhance convenience of a user using an information processing device by considering a dominant hand, habit, or the like, of the user without imposing on the user a task of inputting information on a dominant hand, habit or the like.

BRIEF DESCRIPTION OF DRAWINGS

FIG. 4 is a diagram explaining an operation for comparing two products;

FIG. 5 shows one example of a comparison screen;

FIG. 7 shows one example of a favorite table;

FIG. 8 shows one example of an object table;

FIG. 9 shows one example of designated position data;

DESCRIPTION OF EMBODIMENTS

In the following, examples of embodiments of the present invention will be described in detail with reference to the accompanying drawings.

First Embodiment

Figure 1:
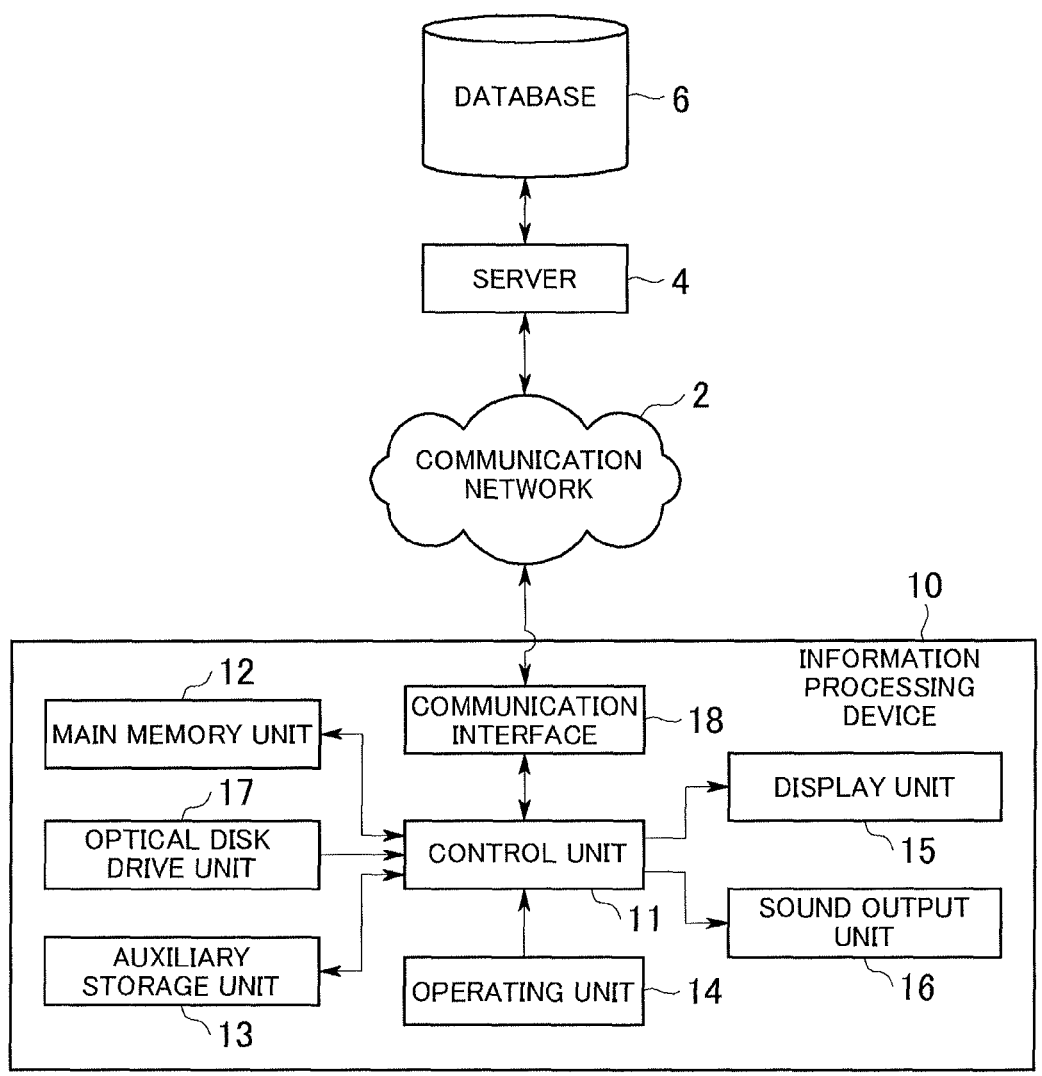
FIG. 1 shows one example of a hardware structure of an information processing device according to an embodiment of the present invention.

Initially, an information processing device according to the first embodiment of the present invention will be described. The information processing device according to the first embodiment is implemented using, for example, a portable phone, a portable information terminal, a personal computer, a game device, or the like. FIG. 1 shows one example of a hardware structure of an information processing device 10 in this embodiment. As shown in FIG. 1, the information processing device 10 includes a control unit 11, a main memory unit 12, an auxiliary storage unit 13, an operating unit 14, a display unit 15, a sound output unit 16, an optical disk drive unit 17, and a communication interface 18.

The control unit 11 includes, for example, one or more CPUs, and executes information processing according to an operation system or a program stored in the auxiliary storage unit 13. The main memory unit 12 is a RAM, for example, while the auxiliary storage unit 13 is a hard disk or a solid state drive, for example.

The operating unit 14 is used for user operation. In this embodiment, a designation unit for a user to designate a position in a screen displayed on the display unit 15 is provided as the operating unit 14. That is, a pointing device, such as, for example, a touch panel, a mouse, a stick, or the like, is provided as the operating unit 14. Note that the following description is based on an assumption that the information processing device 10 has a touch panel provided on the display unit 15.

The touch panel provided to the information processing device 10 is a general touch panel, and capable of detecting one or more positions touched by a user. As a touch panel, a touch panel employing a static capacitance method, for example, is used. With the touch panel employing the static capacitance method, one or more positions touched by a user is/are detected, based on change in the charge that is caused upon a user's touching the surface of the touch panel. The touch panel supplies information indicative of one or more positions touched by the user. The control unit 11 obtains the one or more positions touched by the user, based on the information supplied from the touch panel.

The display unit 15 is a liquid crystal display, or the like, for example, and the sound output unit 16 is a speaker or the like, for example. The optical disk drive unit 17 reads a program and/or data stored in an optical disk (an information storage medium).

Note that, for example, a program and data is supplied to the auxiliary storage unit 13 via an optical disk. That is, an optical disk with a program and data recorded thereon is inserted in the optical disk drive unit 17, and the program and/or data recorded on the optical disk is read by the optical disk drive unit 17 and then stored in the auxiliary storage unit 13. Note that the optical disk drive unit 17 is not an essential structural element. A structural element for reading a program or data stored in an information storage medium (for example, a memory card) other than an optical disk may be included, instead of the optical disk drive unit 17, so that a program and/or data may be supplied to the auxiliary storage unit 13 via an information storage medium other than an optical disk. Alternatively, a program and/or data may be supplied to the auxiliary storage unit 13 via a communication network 2 including, for example, the Internet or the like.

The communication interface 18 is an interface for connecting the information processing device 10 to the communication network 2. The information processing device 10 can access the server 4 via the communication network 2.

The server 4 executes processing based on a processing request received from the information processing device 10. For example, a demon program is activated in the server 4, and upon receipt of a processing request from the information processing device 10, the server 4 accesses the database 6, when necessary, and sends a processing result in response to the processing request to the information processing device 10. The database 6 may be ensured in a server computer different from the server 4 or in the server 4.

In the following, a case will be described in which an electronic commercial site where a user can buy a product via the communication network 2 is provided by the server 4, and an application program for using the electronic commercial site is executed in the information processing device 10.

Initially, the above-described application program will be described. Below, an example of a screen displayed on the display unit 15 of the information processing device 10 in a case where the above-described application program is executed will be described.

Figure 2:
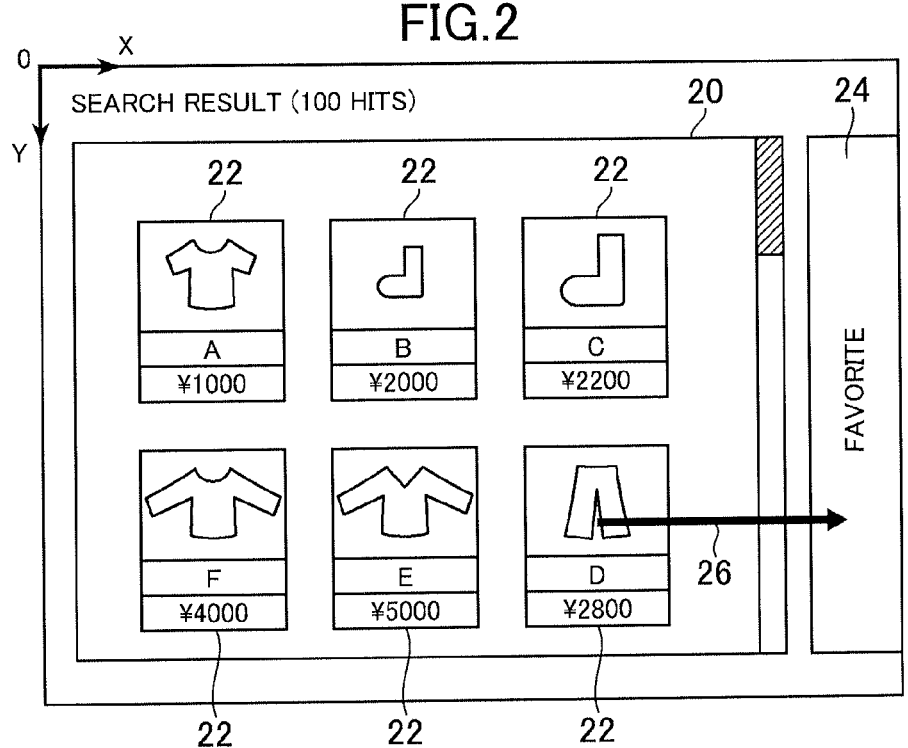
FIG. 2 shows one example of a search result screen.

FIG. 2 shows one example of a search result screen. The search result screen is a screen showing a list of products that satisfy a search condition set based on an input by a user in a search screen (not shown). The search result screen shown in FIG. 2 is a screen showing a list of products satisfying a search result among products that are available for purchase in an electronic commercial site.

In order to show the search result screen, the information processing device 10 obtains a list of products satisfying the search condition that is set based on an input by a user in the search screen. For example, the information processing device 10 (the above-described application program) sends a search condition to the server 4. Having received the search condition, the server 4 accesses the database 6 to obtain a list of products satisfying the search condition. Then, the server 4 sends the obtained product list to the information processing device 10. The information processing device 10 displays the search result screen showing the product list sent from the server 4.

The search result screen shown in FIG. 2 has a list area 20. A list of products satisfying the search condition is displayed in the list area 20. Specifically, a product image 22 of each product satisfying the search condition is displayed in the list area 20. The product image 22 includes a thumb nail image of the product, and the name and price of the product are attached to the product image 22.

The search result screen includes a favorite area 24. The favorite area 24 is used for registration of a product as a favorite among the products displayed in the list area 20.

In the following, an operation for registering a product as a favorite will be described. Assume a case in which a user registers a product "D" as a favorite. In this case, the user touches the touch panel with his/her finger so as to point out the product image 22 of the product "D", then slides the finger to the favorite area 24 on the touch panel, as indicated by the arrow 26. In response to such an operation, the product image 22 of the produce "D" moves to the favorite area 24 in accordance with the movement of the finger, and the product "D" is resultantly registered as a favorite. Upon new registration of a product as a favorite, a favorite screen showing a list of products registered as favorites is displayed.

Figure 3:
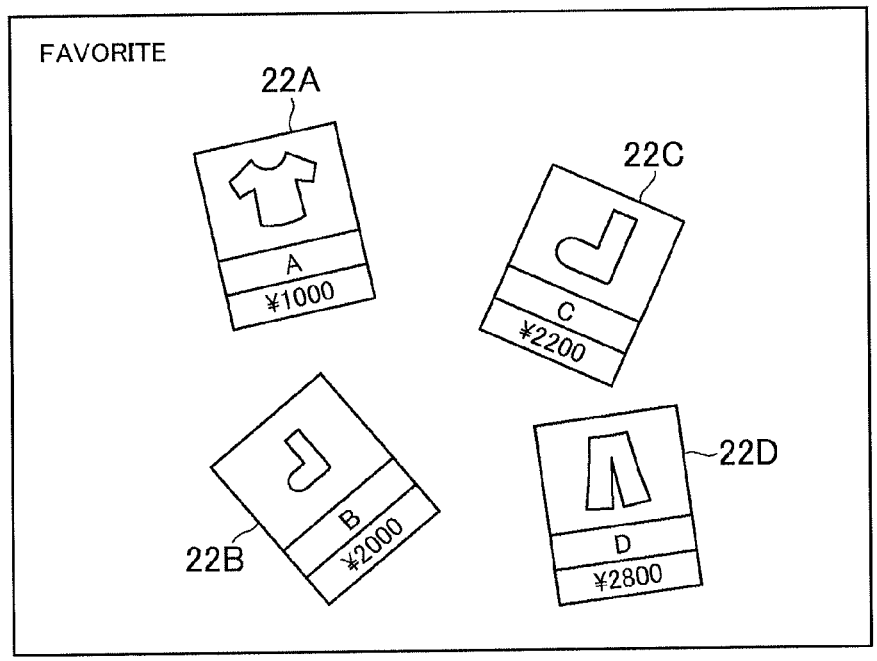
FIG. 3 shows one example of a favorite screen.

FIG. 3 shows one example of the favorite screen. Product images 22 of the products registered as favorites are displayed in the favorite screen. FIG. 3 shows one example of the favorite screen with the products "A", "B", "C", and "D" registered as favorite products. The product images 22A, 22B, 22C, and 22D of the products "A", "B", "C", and "D" are displayed in the favorite screen shown in FIG. 3. In the favorite screen, the product images 22 are displayed scattered, like the product images 22A to 22D shown in FIG. 3.

This favorite screen as well is displayed through data exchange between the information processing device 10 (the above-described application program) and the server 4. That is, when the product image 22 of any product moves to the favorite area 24 in the search result screen, the above-described application program sends the product ID of the product, together with the user ID, to the server 4.

A table showing a product registered by a user as a favorite is stored in the database 6, and the server 4 updates the table based on the above-described user ID and product ID received from the information processing device 10. Further, the server 4 obtains information on a product registered by a user as a favorite from the database 6, and sends the obtained information to the information processing device 10. In the information processing device 10, the information sent from the server 4 is stored in the auxiliary storage unit 13 (see FIG. 7 to be described later), and the favorite screen is displayed based on the information.

In the favorite screen, a user can select and compare two products with each other. In the following, an operation for comparing two products will be described. FIG. 4 is a diagram explaining this operation. Assume a case here in which the products "B" and "C" are compared with each other.

In comparing the products "B" and "C", a user performs, for example, a "pinching operation" to collide the product image 22B of the produce "B" and the produce image 22C of the produce "C" against each other. That is, the user puts one finger (for example, the thumb) of his/her one hand (for example, the right hand) on the touch panel so as to point out the product image 22B of the produce "B", and another finger (for example, the index finger) on the touch panel so as to point out the product image 22C of the produce "C". Thereafter, the user slides these fingers so as to get closer to each other on the touch panel. With such an operation, the product image 22B of the produce "B" and the product image 22C of the produce "C" move getting closer to each other in accordance with the movement of the fingers, as indicated by the arrows 30, 32.

Then, if it is determined that the product image 22B of the produce "B" and the product image 22C of the produce "C" have collided with each other, a comparison screen for comparing the products "B" and "C" is displayed. FIG. 5 shows one example of the comparison screen in this case. A comparison table 40 showing various information (attribute information) on the products "B" and "C" is displayed in the comparison screen in this case.

A purchaser of a product can rate the product with the full score of five points, for example, in the electronic commercial site. That is, the average of the ratings registered by purchasers of the product is displayed in the "rating score" section in the comparison table 40. When a product is registered as a favorite in the above-described search result screen, the server 4 is notified of the fact that the product is registered as a favorite, and the number of users having registered the product as a favorite is stored in the database 6. The "favorite" section in the comparison table 40 shows the number of users having registered the product as a favorite.

A link button 42 for jumping to a shopping screen for buying a respective product is displayed in the comparison screen. Selection of the link button 42 causes a shopping screen (not shown) for buying a concerned product to appear. Further, a close button 44 is also displayed in the comparison screen. Selection of the close button 44 causes the comparison screen to close and the favorite screen to appear again.

In the above described favorite screen, the user can instruct the information processing device 10 to display a comparison screen for two products through an intuitive operation of pointing out to thereby select the two product images 22 and moving the two fingers to thereby move the two product images 22 so as to collide.

Note that a drag and drop operation may be employed as an operation for instructing the information processing device 10 to display a comparison screen for two products. That is, it is feasible to display, when a user performs a drag operation to thereby move one product image 22 onto another product image 22 and then a drop operation with the products images 22 placed one on the other, a comparison screen for two products of those product images 22.

With the above described drag and drop operation employed, however, there may be a case in which, when intending to move, through a drag operation, one product image 22 onto his/her desired product image 22 among a plurality of densely placed product images 22 and then perform a drop operation, a user may perform a drop operation with the one product image 22 erroneously placed on a product image 22 other than his/her desired product image 22. In such a case, a comparison screen for two products not intended by the user is displayed.

On the contrary, according to the information processing device 10 in this embodiment, a user initially selects both of the product images 22 of two products for comparison, and then the user moves the product images 22 so as to collide. As a result, a comparison screen for the two products is displayed. With the above, the above described inconvenience is unlikely caused. That is, even if a product image 22 other than a desired product image 22 is selected, unless the product image 22 is caused to collide against another product image 22, a comparison screen for these products is not displayed. In this case, the user simply detaches his/her finger from the touch panel, and selects again a product image 22. As described above, according to the information processing device 10 in this embodiment, a comparison screen for two products not intended by a user is unlikely displayed.

Further, with the above described drag and drop operation employed, when a user stops the ongoing drag operation halfway in moving one product image 22, which then happens to be placed on another product image 22, a comparison screen for these products is displayed. That is, a comparison screen for two products not intended by the user is displayed. To address the above, the user needs to move the one product image 22 to a position not overlapping another product image 22 before stopping the drag operation.

On the contrary, according to the information processing device 10 in this embodiment, the above described inconvenience is not caused. That is, even when a user detaches his/her finger from the touch panel to select again a different product image 22 after selection of a product image 22 other than a desired product image 22, the user does not need to particularly care whether or not the selected product image 22 happens to be positioned on another product image 22. This is because a comparison screen for products is not displayed even though the product image 22 selected by a user is placed on another product image 22 unless the product images 22 collide with each other.

In the following, a structure for improving user convenience by considering a user's dominant hand, habit, or the like in the information processing device 10 having a user interface (a favorite screen), such as is described above, will be described. In the following, in particular, a structure for enhancing user convenience by considering a user's dominant hand, habit, or the like without imposing on the user a task of inputting information on his/her a dominant hand, habit, or the like will be described.

Figure 6:
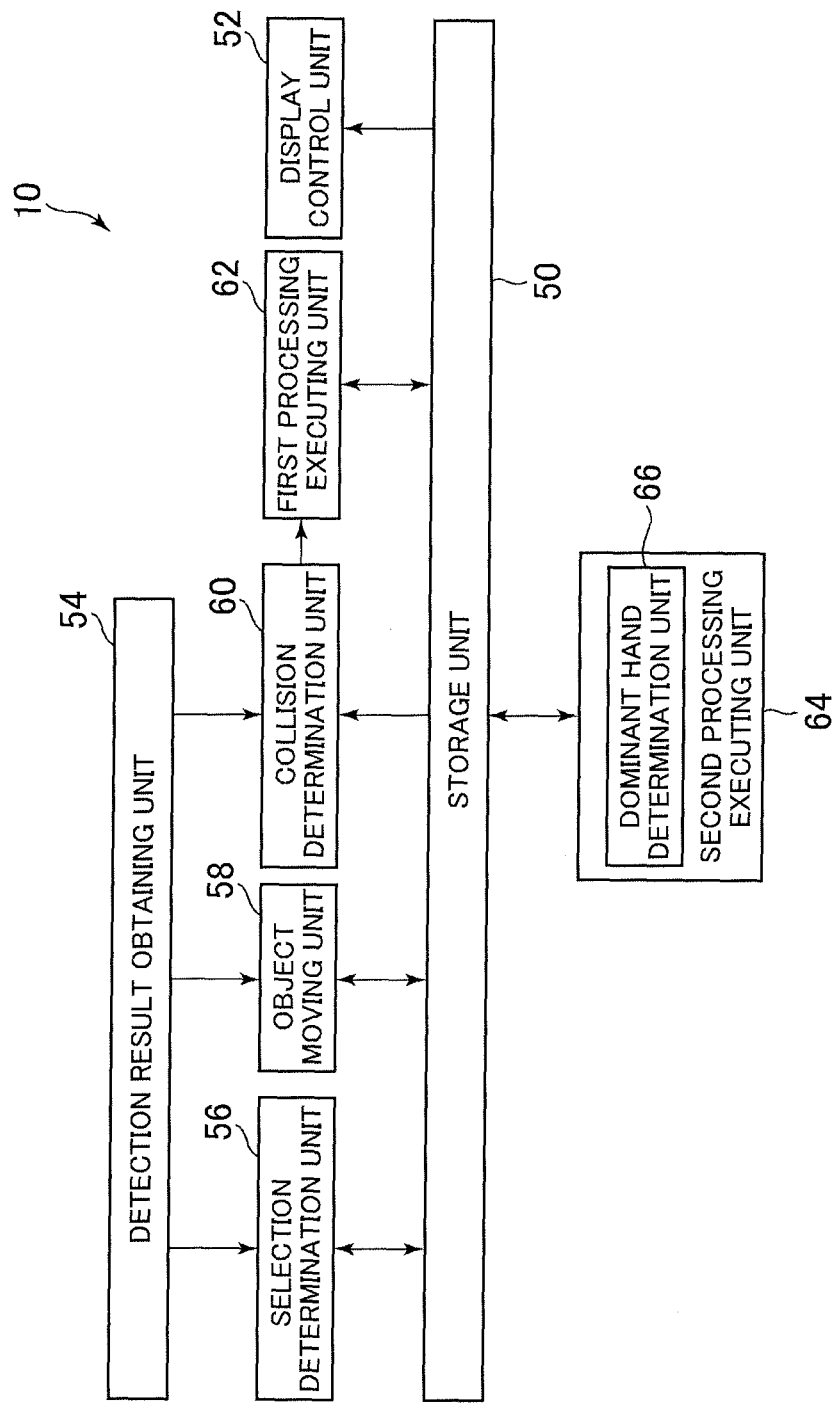
FIG. 6 is a functional block diagram of an information processing device according to first embodiment.

FIG. 6 is a functional block diagram showing a functional block relevant to the present invention among those implemented in the information processing device 10 in this embodiment. As shown in FIG. 6, the information processing device 10 includes a storage unit 50, a display control unit 52, a detection result obtaining unit 54, a selection determination unit 56, an object moving unit 58, a collision determination unit 60, a first processing executing unit 62, and a second processing executing unit 64.

For example, the storage unit 50 is implemented using the main memory unit 12 and the auxiliary storage unit 13. The display control unit 52, the detection result obtaining unit 54, the selection determination unit 56, the object moving unit 58, the collision determination unit 60, a first processing executing unit 62, and a second processing executing unit 64 are implemented by the control unit 11. That is, the control unit 11 executing processing according to a program functions as these functional blocks.

The storage unit 50 will be described. The storage unit 50 stores various data. FIGS. 7 to 9 show one example of data stored in the storage unit 50.

FIG. 7 shows one example of a favorite table. The favorite table is a table showing information on a product registered as a favorite. As described above, in displaying the favorite screen, information on a product registered by a user as a favorite is obtained from the server 4 (database 6). The obtained information is registered in the favorite table.

The favorite table shown in FIG. 7 includes "product ID", "product name", "price", "category", "rating score", "number of registrants to favorite", "image", and "shopping page" fields. In the "product ID" field, identification information (product ID) for uniquely identifying a product is registered. In the "product name" and "price" fields, the name and price of a product are respectively registered. In the "category" field, the category of a product is registered. In the "rating score" field, the average of the rating scores made by purchasers of the product is registered. In the "number of registrants to favorite" field, the number of users having registered the product as a favorite is registered. In the "image" field, link information (URL) to a normal image and a thumb nail image of the product is registered. In the "shopping page" field, link information (URL) to a shopping page (shopping screen) for the product is registered.

FIG. 8 shows one example of the object table. The object table is a table for managing an object (product image 22) displayed in the favorite screen. The object table includes "object ID", "product ID", and "position" fields. In the "object ID" field, identification information (object ID) uniquely identifying an object (product image 22) is registered. In the "product ID" field, the product ID of a product correlated to an object (product image 22) is registered. For example, for the product image 22 of the product "A", the product ID of the product "A" is registered in the "product ID" field. In the "position" field, a display position of an object (product image 22) is registered. For example, the screen coordinates of a representative position (for example, the center position) of an object (product image 22) is registered. Note that a screen coordinate system is a coordinate system having the origin defined at the upper left corner of a screen, the X axis being positive in the rightward direction, and the Y axis being positive in the downward direction.

In the following, the display control unit 52 will be described. The display control unit 52 displays a screen including a plurality of objects on the display unit 15. In this embodiment, the display control unit 52 displays a favorite screen on the display unit 15. That is, in this embodiment, the favorite screen corresponds to the above-described "screen", and a plurality of product images 22 displayed in the favorite screen correspond to the above-described "plurality of objects".

In the following, the detection result obtaining unit 54 will be described. The detection result obtaining unit 54 obtains a result of detection by a detection unit capable of detecting two or more positions designated by a user in a screen. For example, the pointing device corresponds to the "detection unit". In this embodiment, the touch panel corresponds to the "detection unit", and the detection result obtaining unit 54 obtains a user's designated position (a position designated by a user) and detected by the touch panel. For example, when a user designates two positions (a first designated position and a second designated position) in a screen, the touch panel detects the first designated position and the second designated position. Then, the detection result obtaining unit 54 obtains the first designated position and the second designated position detected by the touch panel. In this case, the detection result obtaining unit 54 obtains designated position data, such as is shown in FIG. 9, for example. Note that a user's designated position is expressed using the coordinates of the screen coordinate system.

In the following, the selection determination unit 56 will be described. The selection determination unit 56 determines whether or not a user's designated position is included in any of a plurality of determination areas set corresponding to the respective positions of a plurality of objects. When it is determined that a user's designated position is included in any determination area, the selection determination unit 56 determines that the object corresponding to the determination area is selected by a user.

For example, when a user's first designated position (one designated position) is detected by the detection unit, the selection determination unit 56 determines whether or not the first designated position is included in any determination area. Further, when the user's second designation position (another designated position) is detected by the detection unit, besides the first designated position, the selection determination unit 56 determines whether or not the second designated position is included in another determination area.

Below, the "determination area" will be described. A determination area is an area that is set for determining whether or not a user is pointing out an object. A determination area is set based on the display position of an object, and moves in accordance with movement of the object. For example, an area where an object is displayed is set as a determination area. The determination area may not necessarily coincide with the area where the object is displayed. For example, an area including the entire area where an object is displayed and also being larger than the area where the object is displayed may be set as a determination area. Further, for example, for an object in a relatively complicated shape, a determination area having a relatively simpler shape may be set.

Figure 10:
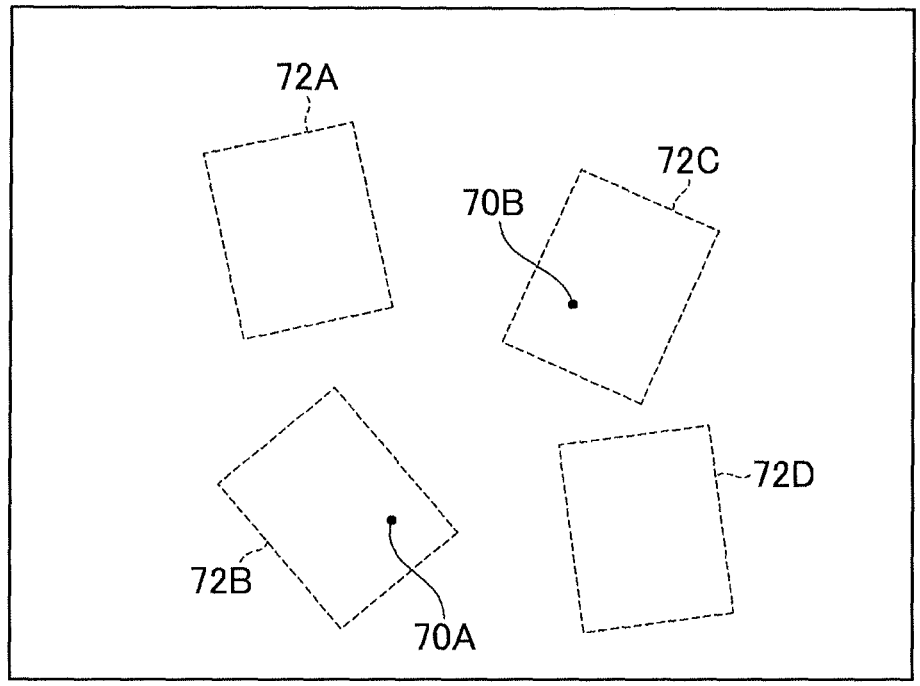
FIG. 10 is a diagram explaining a determination area.

FIG. 10 is a diagram explaining a determination area in a case where the favorite screen, such as is shown in FIG. 3, is displayed. Note that the reference numeral "70A" in FIG. 10 indicates a user's first designated position, and "70B" indicates the user's second designated position.

As product images 22A to 22D are displayed in the favorite screen shown in FIG. 3, determination areas 72A to 72D are set in the example shown in FIG. 10. Note that, in the following, the determination areas 72A to 72D may be collectively referred to as a "determination area 72".

The determination area 72A is a determination area corresponding to the product image 22A of the product "A", and the area where the product image 22A is displayed is set as the determination area 72A. Similarly, the determination area 72B is a determination area corresponding to the product image 22B of the produce "B", and the area where the product image 22B is displayed is set as the determination area 72B. The determination area 72C is a determination area corresponding to the product image 22C of the produce "C", and the area where the product image 22C is displayed is set as the determination area 72C. The determination area 72D is a determination area corresponding to the product image 22D of the produce "D", and the area where the product image 22D is displayed is set as the determination area 72D.

In the example shown in FIG. 10, for example, the selection determination unit 56 determines whether or not the first designated position 70A is included in any of the determination areas 72A to 72D. In the example shown in FIG. 10, as the first designated position 70A is included in the determination area 72B, the selection determination unit 56 determines that the first designated position 70A is included in the determination area 72B. As a result, the selection determination unit 56 determines that the product image 22B is selected by a user. Further, the selection determination unit 56 determines whether or not the second designated position 70B is included in any of the determination areas 72A to 72D. In the example shown in FIG. 10, as the second designated position 70B is included in the determination area 72C, the selection determination unit 56 determines that the second designated position 70B is included in the determination area 72C. As a result, the selection determination unit 56 determines that the product image 22C is selected by a user.

In the following, the object moving unit 58 will be described. When it is determined that a user's designated position is included in the determination area corresponding to any object (that is, when it is determined that an object is selected by a user), the object moving unit 58 moves the object in accordance with movement of the designated position.

For example, when it is determined that the first designated position is included in the first determination area corresponding to the first object, the object moving unit 58 moves the first object in accordance with movement of the first designated position. Further, when it is determined that the second designated position is included in the second determination area corresponding to the second object, the object moving unit 58 moves the second object in accordance with movement of the second designated position.

In the example shown in FIG. 10, for example, as the first designated position 70A is included in the determination area 72B corresponding to the product image 22B, the object moving unit 58 moves the product image 22B in accordance with movement of the first designated position 70A. That is, the object moving unit 58 causes the product image 22B to follow the first designated position 70A.

In the example shown in FIG. 10, as the second designated position 70B is included in the determination area 72C corresponding to the product image 22C, the object moving unit 58 moves the product image 22C in accordance with movement of the second designated position 70B. That is, the object moving unit 58 causes the product image 22C to follow the second designated position 70B.

In the following, the collision determination unit 60 will be described. The collision determination unit 60 determines whether or not a first object and a second object have collided with each other when it is determined that the first designated position is included in the determination area corresponding to the first object and the second designated position is included in the determination area corresponding to the second object and at least one of the first and second objects is moved by the object moving unit 58.

For example, the collision determination unit 60 determines whether or not the first object and the second object have collided with each other by determining whether or not the distance between the first designated position and the second designated position is equal to or smaller than a threshold. The collision determination unit 60 determines that the first object and the second object have collided with each other when at least one of the first and second objects is moved by the object moving unit 58 and the distance between the first designated position and the second designated position is equal to or smaller than the threshold.

In the example shown in FIG. 10, for example, the first designated position 70A is included in the determination area 72B, and the second designated position 70B is included in the determination area 72C. In this case, as described above, the object moving unit 58 moves the product image 22B in accordance with movement of the first designated position 70A and the product image 22C in accordance with movement of the second designated position 70B. In this case, as shown in FIG. 11, the collision determination unit 60 obtains the distance (d) between the first designated position 70A and the second designated position 70B, and determines whether or not the distance (d) is equal to or smaller than the threshold to thereby determine whether or not the product image 22B and the product image 22C have collided with each other.

When it is determined that the above-described distance (d) is equal to or smaller than the threshold, the collision determination unit 60 determines that the product image 22B and the product image 22C have collided with each other. In the example shown in FIG. 11, although the determination area 72B overlaps the determination area 72C (that is, the product image 22B overlaps the product image 22C), the collision determination unit 60 does not determine the product image 22B and the product image 22C have collided with each other unless the above-described distance (d) is equal to or smaller than the threshold.

Figure 11:
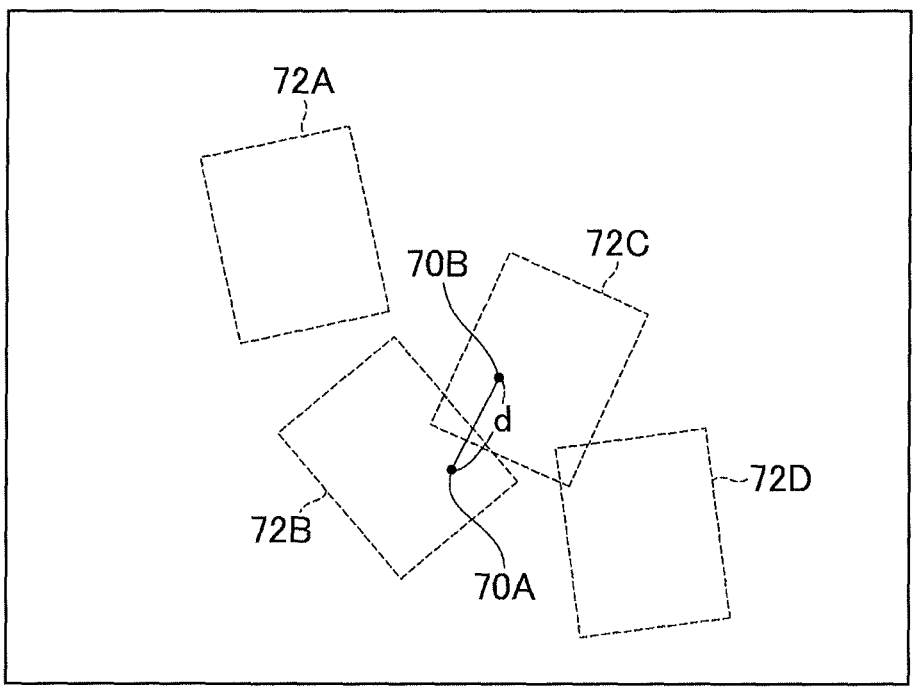
FIG. 11 is a diagram explaining a collision determining method.

In the example shown in FIG. 11, although the determination area 72C overlaps the determination area 72D (that is, the product image 22C overlaps the product image 22D), the collision determination unit 60 does not determine that the product image 22B and the product image 22D have collided with each other as a user's designated position is not included in the determination area 72D.

Note that a collision determining method for an object (product image 22) is not limited to the above described method. For example, the collision determination unit 60 may determine whether or not the first object overlaps the second object, to thereby determine whether or not the first object and the second object have collided with each other. Further, for example, the collision determination unit 60 may determine whether or not the determination area corresponding to the first object overlaps the determination area corresponding to the second object, to thereby determine whether or not the first object and the second object have collided with each other.

In the following, the first processing executing unit 62 will be described. The first processing executing unit 62 executes processing relevant to the first object and the second object, based on a result of determination by the collision determination unit 60. For example, when it is determined that the first object and the second object have collided with each other, the first processing executing unit 62 displays a comparison screen for comparing attribute information correlated to the first object and attribute information correlated to the second object on the display unit 15.

For example, in the example shown in FIG. 11, when it is determined that the product image 22B and the product image 22C have collided with each other, the first processing executing unit 62 executes processing relevant to the product image 22B and the product image 22C. In this case, the first processing executing unit 62 displays a comparison screen, such as is shown in FIG. 5, on the display unit 15. That is, the first processing executing unit 62 shows a comparison screen for comparing information on the product "B" correlated to the product image 22B and information on the product "C" correlated to the product image 22C on the display unit 15.

Figure 12:
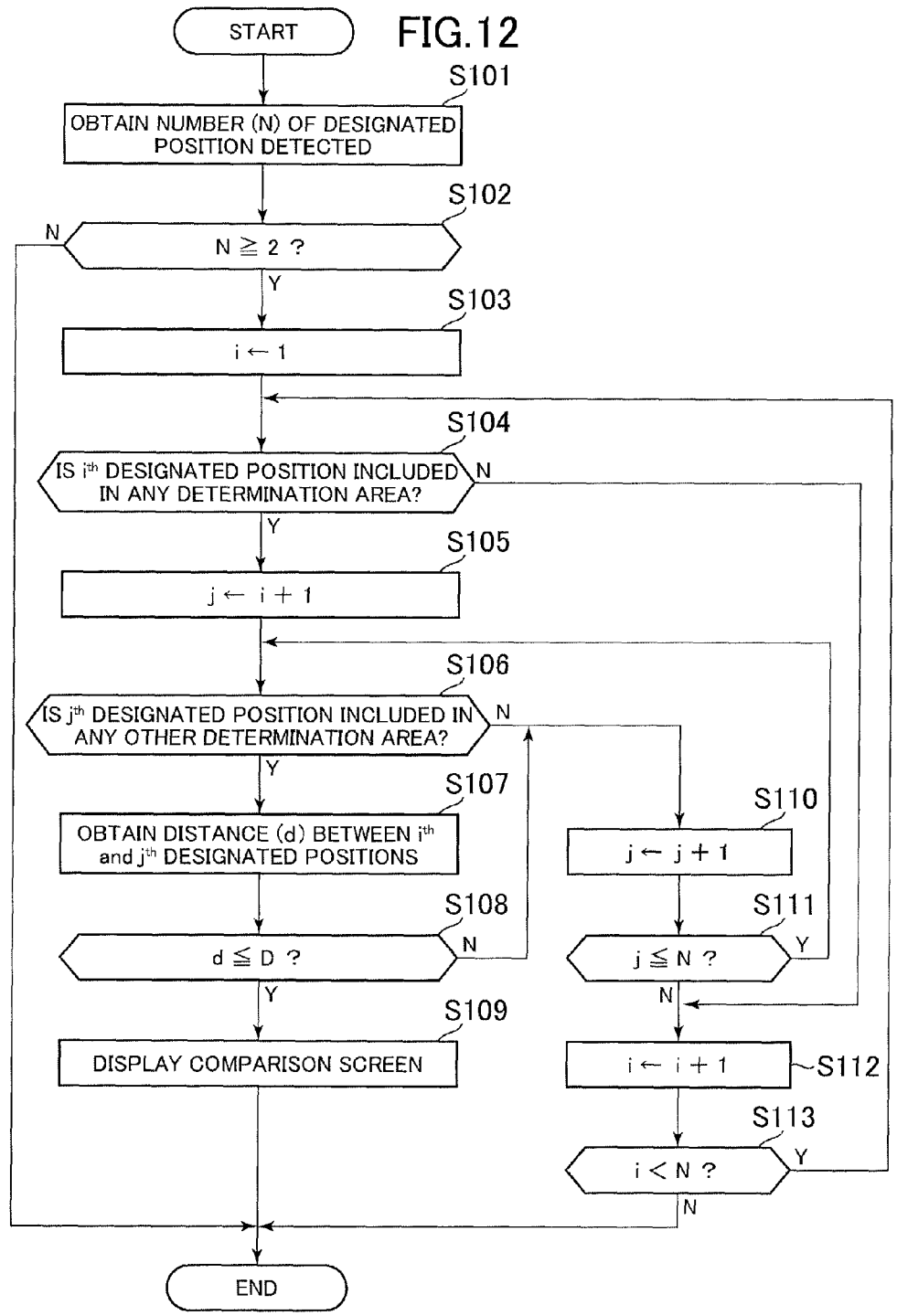
FIG. 12 is a flowchart of an example of processing executed in the information processing device.

In the following, processing for implementing the above described detection result obtaining unit 54, selection determination unit 56, object moving unit 58, collision determination unit 60, and first processing executing unit 62 will be described. FIG. 12 is a flowchart of an example of processing that is repetitively executed for every predetermined period of time (for example, $1/60^{th}$ of a second) in the information processing device 10 while the favorite screen is displayed. Note that processing for moving the product image 22 in accordance with change of a user's designated position is also executed while the favorite screen is displayed, which, however, is not shown in FIG. 12. FIG. 12 mainly shows processing for determining whether or not the product images 22 have collided. The control unit 11 executes the processing shown in FIG. 12 according to the program, and as a result, the control unit 11 functions as the detection result obtaining unit 54, the selection determination unit 56, the object moving unit 58, the collision determination unit 60, and the first processing executing unit 62.

As shown in FIG. 12, initially, the control unit 11 (detection result obtaining unit 54) obtains the number (N) of a user's designated positions detected by the detection unit (touch panel) (S101). Then, the control unit 11 determines whether or not the obtained number (N) is two or larger (S102). If the obtained number (N) is not two or larger, the control unit 11 terminates this processing.

Meanwhile, if the obtained number (N) is two or larger, the control unit 11 initialize the value of the variable i to 1 (S103). Then, the control unit 11 (selection determination unit 56) determines whether or not the $i^{th}$ designated position is included in any determination area 72 (S104). Note that "the $i^{th}$ designated position" refers to the $i^{th}$ designated position among the designated positions detected by the detection unit (touch panel).

If the $i^{th}$ designated position is included in any determination area 72, the control unit 11 (selection determination unit 56) initializes the value of the variable j to i+1 (S105), and determines whether or not the $j^{th}$ designated position is included in another determination area 72 (S106). Note that "another determination area 72" refers to a determination area 72 other than the determination area 72 that is determined at step S104 as including the $i^{th}$ designated position.

If the $j^{th}$ designated position is included in another determination area 72, the control unit 11 obtains the distance (d) between the $i^{th}$ designated position and the $j^{th}$ designated position (S107). Then, the control unit 11 (collision determination unit 60) determines whether or not the distance (d) is equal to or smaller than the threshold (D) (S108). If the distance (d) is equal to or smaller than the threshold (D), the control unit 11 (first processing executing unit 62) determines the product images 22 have collided, and displays the comparison screen (FIG. 5) on the display unit 15. In this case, a comparison screen for the product of the product image 22 corresponding to the determination area that is determined at step S104 as including the $i^{th}$ designated position and the product of the product image 22 corresponding to the determination area 72 that is determined at step S106 as including the $j^{th}$ designated position is displayed. The comparison screen is displayed based on the favorite table shown in FIG. 7.

Meanwhile, if it is not determined at step S104 that the $i^{th}$ designated position is included in any determination area 72, the control unit 11 increments the value of the variable i (S112), and then determines whether or not the variable i is smaller than the number (N) of the user's designated positions detected (S113). If it is determined that the variable i is smaller than the number (N) of the user's designated positions detected, the control unit 11 executes the processing at step S104. Meanwhile, if it is not determined that the variable i is smaller than the number (N) of the user's designated positions detected, the control unit 11 terminates this processing.

Further, if it is not determined at step S106 that the $j^{th}$ designated position is included in another determination area 72 or if it is not determined at step S108 that the distance (d) is equal to or smaller than the threshold (D), the control unit 11 increments the value of the variable j (S110), and then determines whether or not the value of the variable j is equal to or smaller than the number (N) of the user's designated positions detected (S111). If it is determined that the variable j is equal to or smaller than the number (N) of the user's designated positions detected, the control unit 11 executes the processing at step S106. Meanwhile, if it is not determined that the variable j is equal to or smaller than the number (N) of the user's designated positions detected, the control unit 11 executes the processing at step S112. Description on the processing shown in FIG. 12 is completed with the above.

In the following, the second processing executing unit 64 will be described. The second processing executing unit 64 is a functional block for enhancing user convenience by considering a dominant hand, habit, or the like, of a user.

The second processing executing unit 64 executes predetermined processing, based on positional relationship information on a positional relationship between "the one object or the one designated position" and "the other object or the other designated position" in a case in the past in which it is determined that a user's one designated position is included in the determination area corresponding to one object of a plurality of objects and the user's another designated position is included in the determination area corresponding to another object of the plurality of objects.

In the following, the above mentioned "positional relationship information" and "predetermined processing" will be described.

Initially, "positional relationship information" will be described. For example, "positional relationship information" is direction information on a direction from "the one object or the one designated position" to "the other object or the other designated position" in a case in the past in which it is determined that the one designated position is included in the determination area corresponding to the one object and the other designated position is included in the determination area corresponding to the other object.

Figures 13, 14:
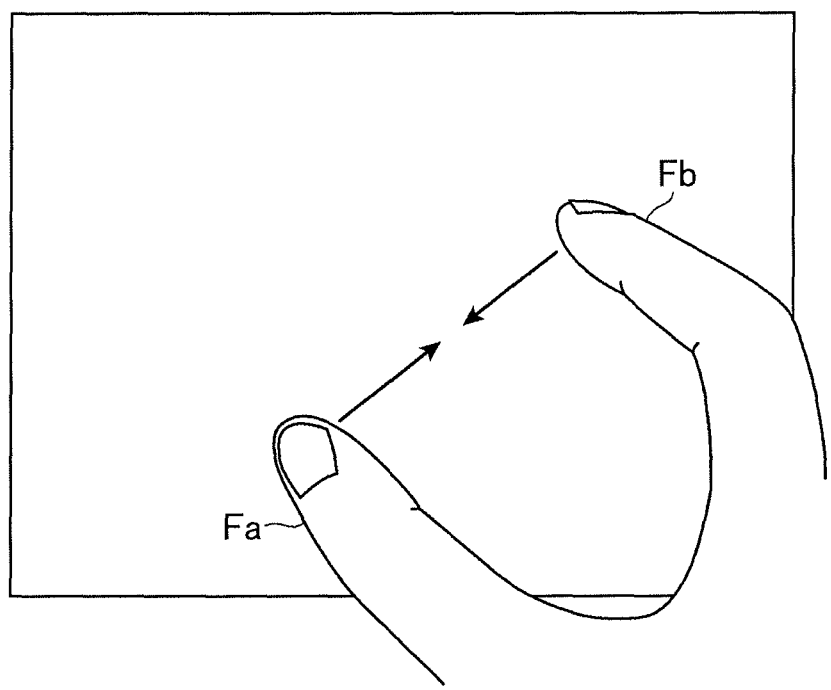
FIG. 13 shows one example of history data.
FIG. 14 is a diagram explaining a pinching operation readily performed by a right-handed user.

FIG. 13 shows one example of history data stored in the storage unit 50. The history data shown in FIG. 13 shows history of direction information indicating the direction from one object to the other object at a moment in the past at which it is determined that two objects are selected by a user. The direction information is, for example, vector information indicating the direction from the representative position (for example, the center position) of one of the two objects in collision that has smaller X axial coordinates than those of the other to the representative position (for example, the center position) of the other object.

Note that the direction information may be vector information indicating the direction from one designated position to the other designated position. Alternatively, the direction information may be vector information indicating the direction from the representative position of one object to a designated position corresponding to the other object (that is, a designated position determined as being included in the determination area corresponding to the other object), or vector information indicating the direction from a designated position corresponding to one object to the representative position of the other object.

Still alternatively, the direction information may be vector information indicating the direction from one object to the other object at a moment other than a moment of determination that two objects are selected by a user. For example, the direction information may be vector information indicating the direction from one object to the other object at a moment of determination that two objects have collide.

In the following, "predetermined processing" will be described. "Predetermined processing" is processing for enhancing user convenience.

In this embodiment, "predetermined processing" includes dominant hand determination processing for determining a user's dominant hand. That is, in this embodiment, the second processing executing unit 64 includes a dominant hand determination unit 66. The dominant hand determination unit 66 executes the above-described dominant hand determination processing based on the above-described positional relationship information, to thereby determine a user's dominant hand. For example, the dominant hand determination unit 66 determines a user's dominant hand based on the above-described history data (FIG. 13).

For example, it is considered that, generally, a right handed user can readily perform a pinching operation such as is shown in FIG. 14. That is, a right handed user can readily perform a pinching operation of getting his/her thumb Fa and index finger Fb closer to each other from a state in which the index finger Fb is positioned on the upper right side of the thumb Fa. Thus, a right handed user tends to collide two product images 22 having such a positional relationship that one product image 22 is positioned on the upper right side of the other product image 22.

Figure 15:
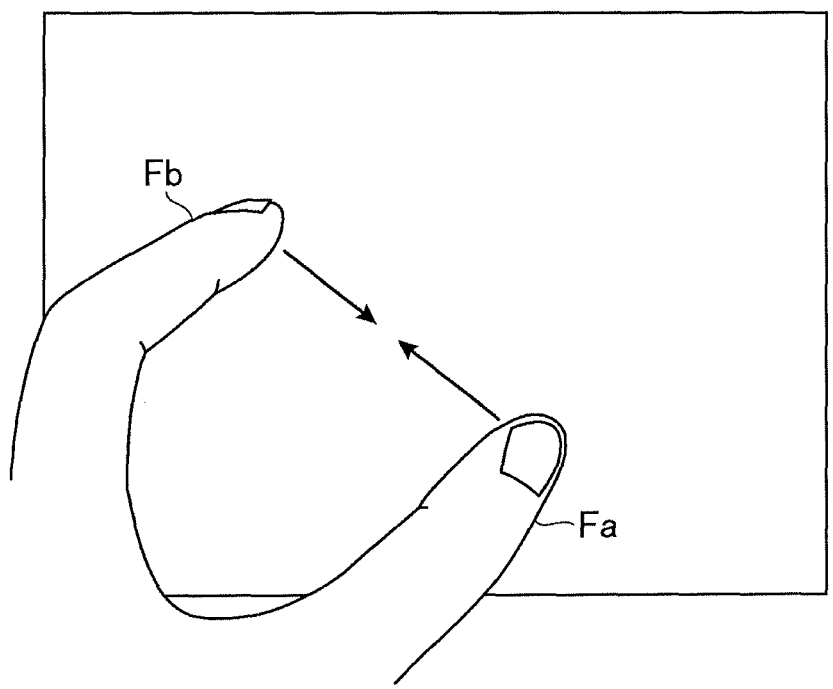
FIG. 15 is a diagram explaining a pinching operation readily performed by a left-handed user.

Meanwhile, it is considered that, generally, a left handed user can readily perform a pinching operation such as is shown in FIG. 15. That is, a left handed user can readily perform a pinching operation of getting his/her thumb Fa and index finger Fb closer to each other from a state in which the thumb Fa is positioned on the lower right side of the index finger Fb. Thus, a left handed user tends to collide two product images 22 having such a positional relationship that one product image 22 is positioned on the lower right side of the other product image 22.

Determination on a user's dominant hand may be made in consideration of the above described tendency. In the following, one example of processing for determining a user's dominant hand is described, which, however, is not limiting.

Figure 16:
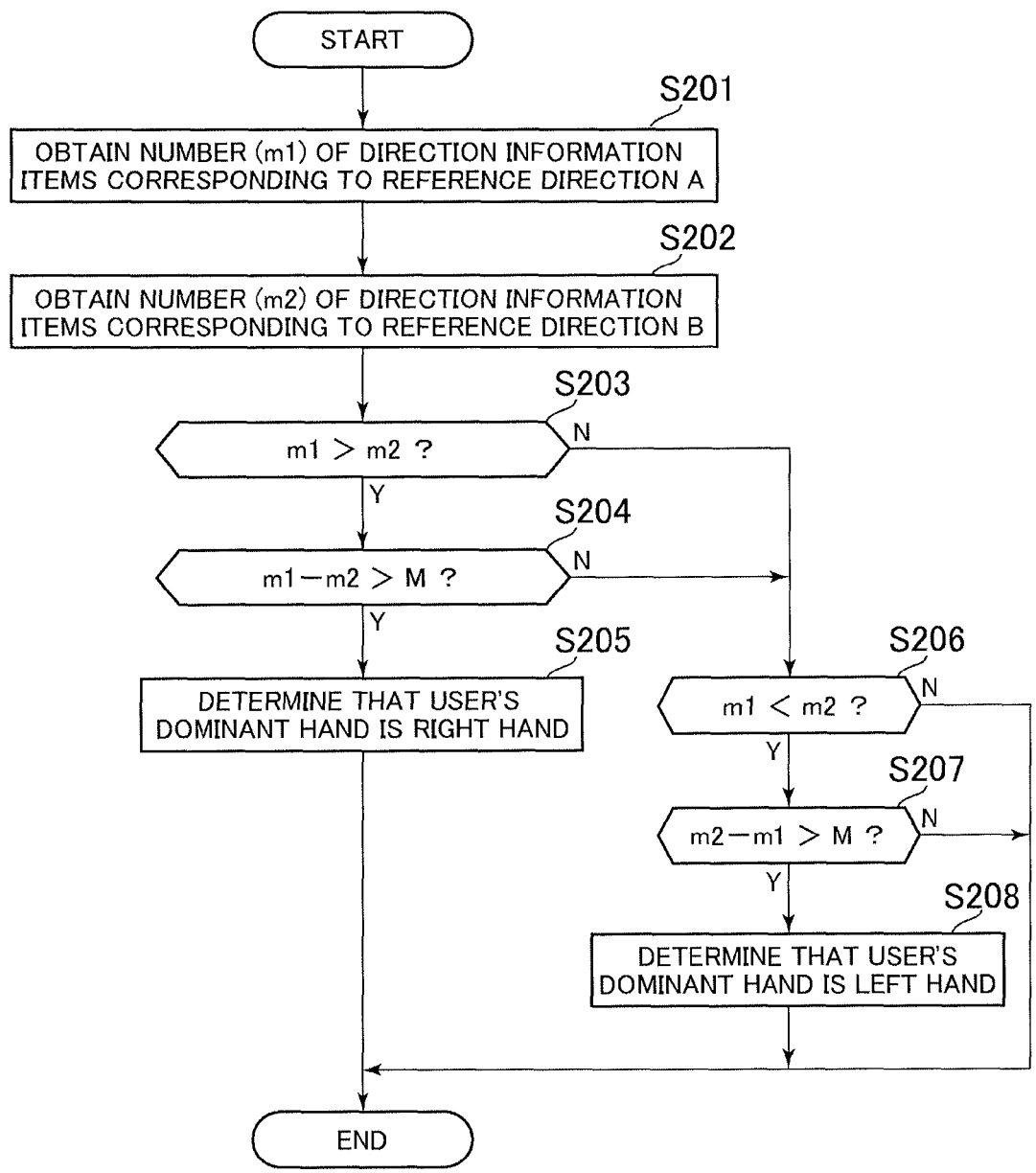
FIG. 16 is a flowchart of an example of processing executed in the information processing device.

FIG. 16 is a flowchart of one example of a user's dominant hand determination processing. The control unit 11 executes the processing shown in FIG. 16 according to a program, and as a result, the control unit 11 functions as the dominant hand determination unit 66 (second processing executing unit 64).

Figures 17, 18:
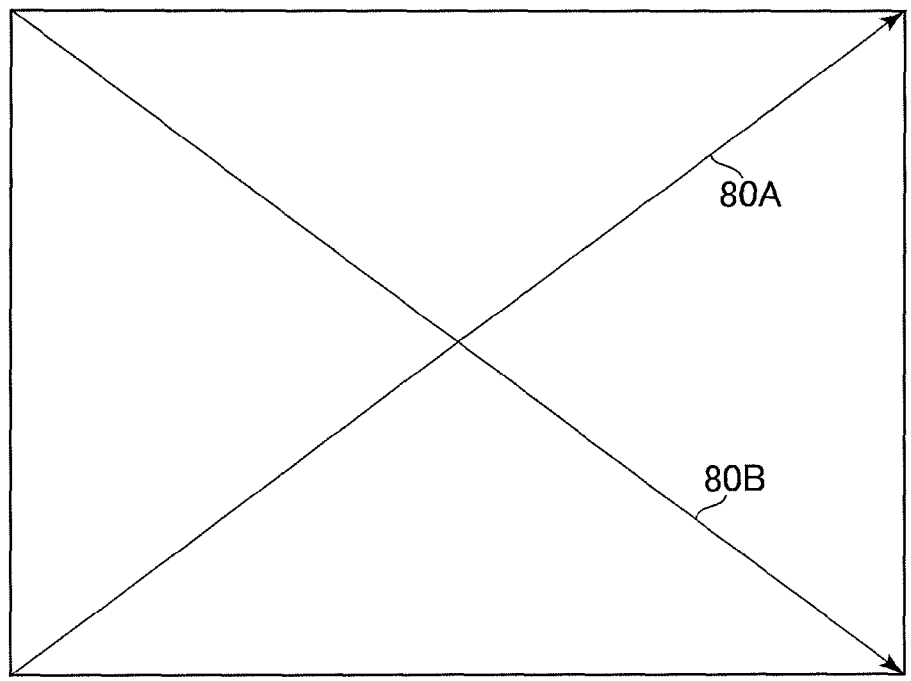
FIG. 17 is a diagram explaining processing executed in the information processing device.
FIG. 18 shows another example of history data.

FIG. 17 is a diagram explaining the processing shown in FIG. 16. "Reference direction A" at step S201 in FIG. 16 indicates the reference direction 80A shown in FIG. 17. The reference direction 80A is a reference direction corresponding to a pinching operation readily performed by a right handed user (FIG. 14). For example, the reference direction 80A is a direction from the lower left vertex of a screen to the upper right vertex. Meanwhile, "reference direction B" at step S202 in FIG. 16 corresponds to the reference direction 80B shown in FIG. 17. The reference direction 80B is a reference direction corresponding to a pinching operation readily performed by a left handed user (FIG. 15). For example, the reference direction 80B is a direction from the upper left vertex of a screen to the lower right vertex.

As shown in FIG. 16, initially, the control unit 11 (dominant hand determination unit 66) obtains the number (m1) of direction information items corresponding to the reference direction 80A from among a plurality of direction information items included in the history data (FIG. 13) (S201). Note that "direction information corresponding to the reference direction 80A" is, for example, direction information indicating a direction in parallel to or in substantially parallel to the reference direction 80A. Specifically, "direction information corresponding to the reference direction 80A" is, for example, direction information with the angle formed by the direction indicated by the direction information and the reference direction 80A being equal to or smaller than a reference angle.

Further, the control unit 11 (dominant hand determination unit 66) obtains the number (m2) of direction information items corresponding to the reference direction 80B from among a plurality of direction information items included in the history data (FIG. 13) (S202). Note that "direction information corresponding to the reference direction 80B" is, for example, direction information indicating a direction in parallel to or in substantially parallel to the reference direction 80B. Specifically, "direction information corresponding to the reference direction 80B" is, for example, direction information with the angle formed by the direction indicated by the direction information and the reference direction 80B being equal to or smaller than a reference angle.

The control unit 11 (dominant hand determination unit 66) compares the above-described number (m1) and the above-described number (m2) to determine a user's dominant hand based on the result of comparison (S203 to S208).

That is, the control unit 11 determines whether or not the above-described number (m1) is larger than the above-described number (m2) (S203). If the above-described number (m1) is larger than the above-described number (m2), the control unit 11 determines whether or not the difference between the above-described number (m1) and the above-described number (m2) is equal to or larger than a reference value (M) (S204). If the difference between the above-described number (m1) and the above-described number (m2) is larger than the reference value (M), the control unit 11 determines that the user's dominant hand is a right hand (S205).

Note that the processing at step S204 may be omitted. In the above described manner, it may be determined that the user's dominant hand is a right hand when it is determined that the above-described number (m1) is larger than the above-described number (m2).

Meanwhile, if it is not determined at step S203 that the above-described number (m1) is larger than the above-described number (m2) or if it is not determined at step S204 that the difference between the above-described number (m1) and the above-described number (m2) is larger than the reference value (M), the control unit 11 determines whether or not the above-described number (m2) is larger than the above-described number (m1) (S206).

If the above-described number (m2) is larger than the above-described number (m1), the control unit 11 determines whether or not the difference between the above-described number (m2) and the above-described number (m1) is larger than the reference value (M) (S207). Then, if the difference between the above-described number (m2) and the above-described number (m1) is larger than the reference value (M), the control unit 11 (dominant hand determination unit 66) determines that the user's dominant hand is a left hand (S208).

Note that the processing at step S207 may be omitted. In the above described manner, it may be determined that the user's dominant hand is a left hand when it is determined that the above-described number (m2) is larger than the above-described number (m1).

Meanwhile, if it is not determined at step S206 that the above-described number (m2) is larger than the above-described number (m1) or if it is not determined at step S207 that the difference between the above-described number (m2) and the above-described number (m1) is larger than the reference value (M), the control unit 11 terminates the processing without determining the user's dominant hand. Description on the processing shown in FIG. 16 is completed with the above.

As described above, according to the information processing device 10 in this embodiment, a user's dominant hand is determined based on the direction information on the direction from one product image 22 to the other product image 22 at a moment in the past at which it is determined that two product images 22 are selected by a user. That is, it is possible to determine a user's dominant hand without imposing on the user a task of inputting information on his/her dominant hand.

Besides, in determining a user's dominant hand, distance information (positional relationship information) on the distance between two products objects 22 at a moment in the past at which it is determined that the two product images 22 are selected by a user may be considered. Note that the distance information may be information on the distance between one designated position and the other designated position. Alternatively, the distance information may be information on the distance between the representative position of one object and a designated position corresponding to the other object (that is, a designated position determined as being included in the determination area corresponding to the other object), or the distance between a designated position corresponding to one object and the representative position of the other object.

For example, when the distance between two product images 22 at a moment in the past at which it is determined that the two product images 22 are selected by a user is large, it is highly likely that the user is selecting one product image 22 with his/her right hand finger and the other product image 22 with his/her left hand finger. It is not desirable to use the direction information (that is, direction information on the direction from one product image 22 to the other product image 22) in such a case in determination of a user's dominant hand. Therefore, the dominant hand determination unit 66 may not use the above described direction information in such a case in determination of a user's dominant hand.

In order not to use the above described direction information in the above described case in determination of a user's dominant hand, for example, the above described direction information in the above described case may not be included in the history data (FIG. 13). Alternatively, for example, history data such as is shown in FIG. 18 may be stored instead of the history data shown in FIG. 13. That is, the history data shown in FIG. 18 is data correlating the above described direction information and the above described distance information. In addition, direction information correlated to distance information indicating a distance larger than a reference distance may be ignored at steps S201 and S202 in FIG. 16. With the above, it is possible to improve accuracy in determination of a user's dominant hand.

In a case where a user's dominant hand is determined by the dominant hand determination unit 66, data indicating the result of determination is stored in the storage unit 50. The data will be hereinafter referred to as "dominant hand data". The dominant hand data is used in various processing.

For example, the dominant hand data is used in displaying the favorite screen. For example, the display control unit 52 sets the initial display positions of the plurality of product images 22 displayed in the favorite screen, based on the dominant hand data. In the following, one example of processing for setting the initial display position of the product image 22 will be described.

Initially, the display control unit 52 obtains a combination of two product images 22 which a user highly likely collide.

That is, the display control unit 52 obtains a combination of two products which a user highly likely selects as comparison targets.

A combination of two products which a user highly likely select as comparison targets can be obtained based on product attribute information, for example. For example, generally, it is considered that a user highly likely selects as comparison targets two products having attribute information of high similarity. Specifically, generally, it is considered that a user highly likely selects two products of the same kind as comparison targets. Further, generally, it is considered that a user highly likely selects two products at a similar price level as comparison targets.

Therefore, in order to obtain a combination of two product images 22 which a user highly likely collide, as to each of the plurality of product images 22 shown in the favorite screen, the display control unit 52 (comparing means) compares the product attribute information correlated to the product image 22 and that correlated to another image 22. Then, the display control unit 52 determines two product images 22 leading to a comparison result being a predetermined result as a combination of two product images 22 which a user highly likely collide. Note that a "predetermined result" is a comparison result that, for example, the categories are the same or similar, that the prices are the same or similar (in other words, the difference in price is equal to or smaller than a reference value), or so forth.

Note that a combination of two products which a user highly likely select as comparison targets can be obtained based on, for example, a combination of two products selected by the user in the past as comparison targets. For example, generally, it is considered that a combination of products having been selected as comparison targets many times in the past is highly likely selected as comparison targets by a user.

Thus, information on a combination of product images 22 having been collided by a user in the past (that is, a combination of products having been selected as comparison targets in the past by a user) may be stored in the storage unit 50. Based on the information, the display control unit 52 may obtain a combination of two product images 22 which the user highly likely collide. For example, the display control unit 52 may obtain a combination of product images 22 having been collided a larger number of times than a reference number of times as a combination of two product images 22 which a user highly likely collide.

When a combination of two product images 22 which a user highly likely collide is obtained, the display control unit 52 sets the initial display positions of these two product images 22 based on the dominant hand data.

Figures 19, 20:
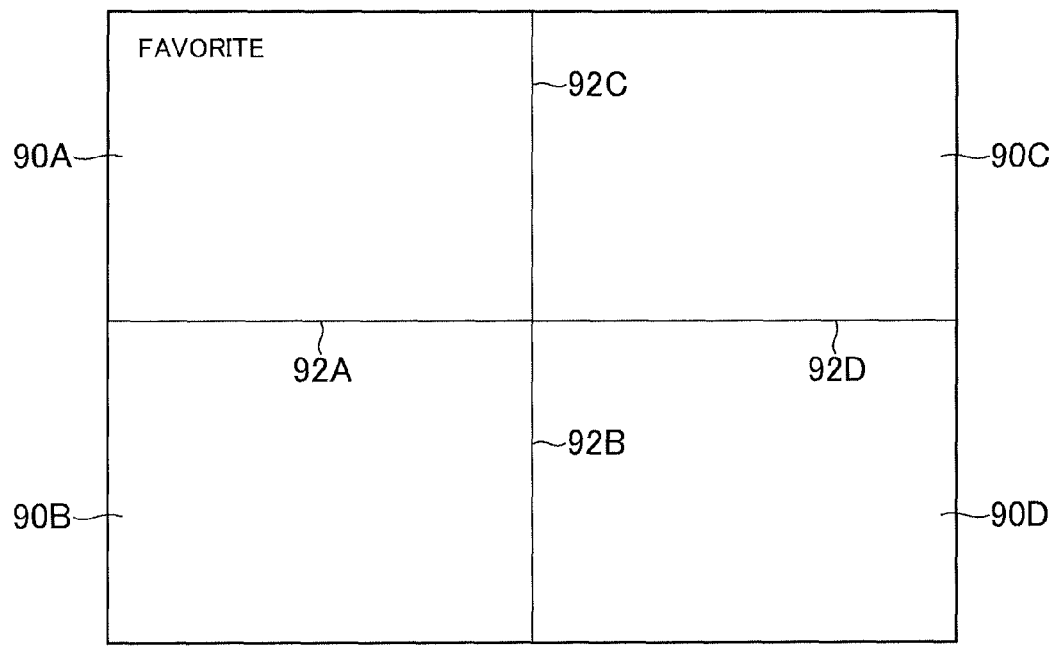
FIG. 19 is a diagram explaining initial display position data.
FIG. 20 shows one example of initial display position data.

In order to set the initial display position of the product image 22 based on the dominant hand data, data correlating the dominant hand data (a user's dominant hand) and the initial display position of the product image 22 is necessary. In the following, the data will be referred to as "initial display position data". FIGS. 19 and 20 are diagrams explaining the initial display position data.

In this embodiment, for example, a plurality of areas 90A, 90B, 90C, and 90D such as are shown in FIG. 19 are virtually set in the favorite screen. In the example shown in FIG. 19, the favorite screen is halved horizontally and vertically so that four areas 90A, 90B, 90C, and 90D are virtually set in the favorite screen.

The area 90A is an upper left area in the favorite screen; the area 90B is a lower left area in the favorite screen; the area 90C is an upper right area in the favorite screen; and the area 90D is a lower right area in the favorite screen. The areas 90A and 90D have a positional relationship in which the area 90D is positioned on the lower right side of the area 90A, and the areas 90B and 90C have a positional relationship in which the area 90C is positioned on the upper right side of the area 90B.

Note that in FIG. 19, the reference numeral "92A" indicates the boundary between the areas 90A and 90B, and the reference numeral "92B" indicates the boundary between the areas 90B and 90D. The reference numeral "92C" indicates the boundary between the areas 90A and 90C, and the reference numeral "92D" indicates the boundary between the areas 90C and 90D.

FIG. 20 shows one example of the initial display position data. The initial display position data shown in FIG. 20 correlates a user's dominant hand and the initial display position of the product image 22. Note that the respective areas A, B, C, and D shown in FIG. 20 correspond to the respective areas 90A, 90B, 90C, and 90D shown in FIG. 19. According to the initial display position data shown in FIG. 20, as the initial display position of the product image 22, the areas 90B and 90C are correlated to a "right hand" as a dominant hand, while the areas 90A and 90D are correlated to a "left hand" as a dominant hand.

For example, if the dominant hand data indicates that a user's dominant hand is a right hand, the display control unit 52 obtains the initial display position (areas 90B and 90C) correlated to a "right hand" as the dominant hand, with reference to the initial display position data. In this case, the display control unit 52 sets the initial display position of one of the two product images 22 which a user highly likely select as comparison targets in the area 90B and the initial display position of the other in the area 90C.

Meanwhile, if the dominant hand data indicates that a user's dominant hand is a left hand, the display control unit 52 obtains the initial display position (areas 90A and 90D) correlated to a "left hand" as a dominant hand, with reference to the initial display position data. In this case, the display control unit 52 sets the initial display position of one of the two product images 22 which a user highly likely select as comparison targets in the area 90A and the initial display position of the other in the area 90D.

Assume here that the product images 22A to 22D shown in FIG. 3 are displayed in the favorite screen. In this case, as the product images 22B and 22C belong to the same product category (that is, socks) and are priced similar, the product images 22B and 22C are determined as two product images 22 which a user highly likely collide.

Figure 21:
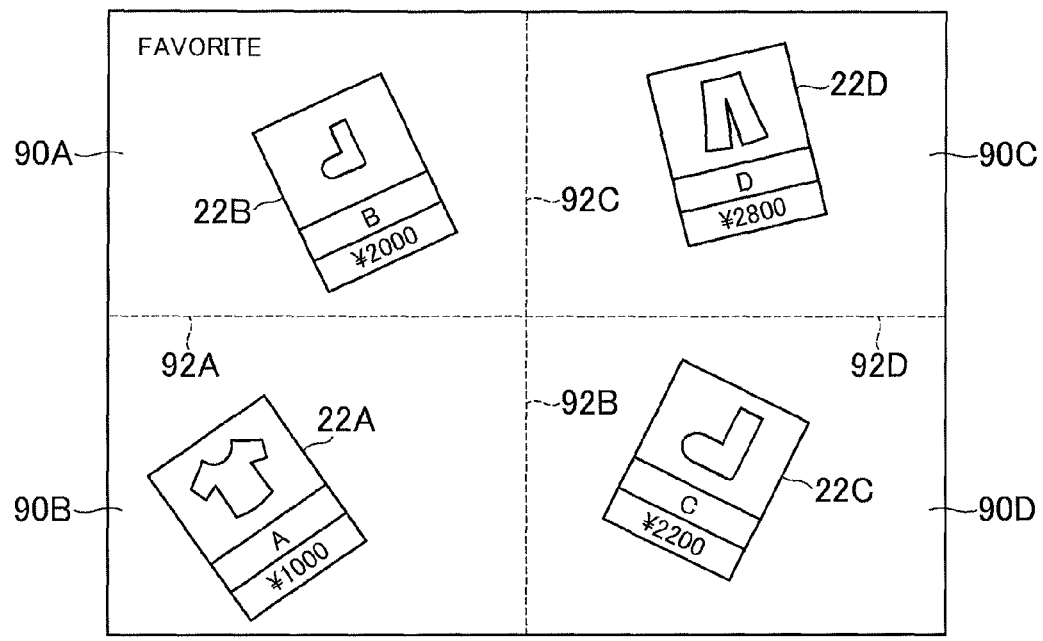
FIG. 21 shows one example of the initial display position of a product image.

Further, if the dominant hand data indicates that a user's dominant hand is a left hand, the initial display position of one of the product images 22B and 22C is set in the area 90A, and that of the other in the area 90D, as showing FIG. 21, for example. In this case, for example, either of the product images 22B and 22C is selected at random as a product image 22 to be initially displayed in the area 90A, and the product image 22 not selected as a product image 22 to be initially displayed in the area 90A is selected as a product image 22 to be initially displayed in the area 90D.

In the example shown in FIG. 21, the product image 22B is selected as a product image 22 to be initially displayed in the area 90A, and the product image 22C is selected as a product image 22 to be initially displayed in the area 90D. Note that, in this case, a position in the area 90A at which to initially display the product image 22B is determined at random. Similarly, a position in the area 90D at which to initially display the product image 22C is determined at random. Orientations of the product images 22B and 22C are also determined at random.

Note that the initial display positions of the product images 22A and 22D, not determined as product images 22 which a user highly likely collide, are set in the areas 90B and 90C other than the areas 90A and 90D, respectively. That is, in this case, positions in the areas 90B and 90C are determined at random as the initial display positions of the product images 22A and 22D. Orientations of the product images 22A and 22D are also determined at random.

Meanwhile, if the dominant hand data indicates that a user's dominant hand is a right hand, the initial display position of one of the product images 22B and 22C is set in the area 90B, and that of the other in the area 90C. In this case, the initial display positions of the product images 22A and 22D, not determined as product images 22 which a user highly likely collide, are set in the areas 90B and 90C other than the areas 90A and 90D, respectively.

In this manner, it is possible to assist a user to readily collide the product images 22 by considering the user's dominant hand. That is, it is possible to assist a user to readily select two products as comparison targets.

Note that one of the product images 22B and 22C which a user highly likely collide may be displayed in both of the areas 90A and 90B and the other in both of the areas 90C and 90D in the favorite screen shown in FIG. 21, for example, before completion of determination by the dominant hand determination unit 66 (that is, when the dominant hand data indicating whether a user's dominant hand is a right hand or a left hand is not stored in the storage unit 50). With the above, it is possible to assist a user to readily collide the product images 22 even before the dominant hand determination unit 66 determines the user's dominant hand. That is, it is possible to assist a user to readily select two products as comparison targets.

Note that although a case is described above in which the dominant hand data is used in displaying the favorite screen, the dominant hand data can be used not only in displaying the favorite screen. For example, the dominant hand data can be used in searching for a product (information search) as well.

For example, there is a case in which a right handed product and a left handed product are both available for some kinds of products. As to stationery, for example, right handed stationery and left handed stationery may be both available. Specifically, right handed scissors and left handed scissors are available. Therefore, for example, when a user designates a specific product category (for example, stationery) as a search condition in a search screen, the user's dominant hand may be automatically added as apart of the search condition based on the dominant hand. This enables a search in consideration of a user's dominant hand.

According to the information processing device 10 in the first embodiment described above, it is possible to enhance user convenience by considering a user's dominant hand without imposing on the user a task of inputting information on the user's dominant hand.

Second Embodiment

An information processing device according to a second embodiment of the present invention will be described. An information processing device 10 in the second embodiment has a hardware structure similar to that of the information processing device 10 in the first embodiment (see FIG. 1).

In the second embodiment as well, an electronic commercial site is provided by the server 4, and an application program for using the above described electronic commercial site is executed in the information processing device 10. That is, in the second embodiment as well, the search result screen shown in FIG. 2, the favorite screen shown in FIG. 3, and the comparison screen shown in FIG. 5 are displayed on the display unit 15.

Whereas the information processing device 10 in the first embodiment determines a user's dominant hand and sets the initial display position of the product image 22 displayed in the favorite screen based on the user's dominant hand, the information processing device 10 in the second embodiment differs from the first embodiment in that the initial display position of the product image 22 displayed in the favorite screen is set without determining a user's dominant hand.

Figure 22:
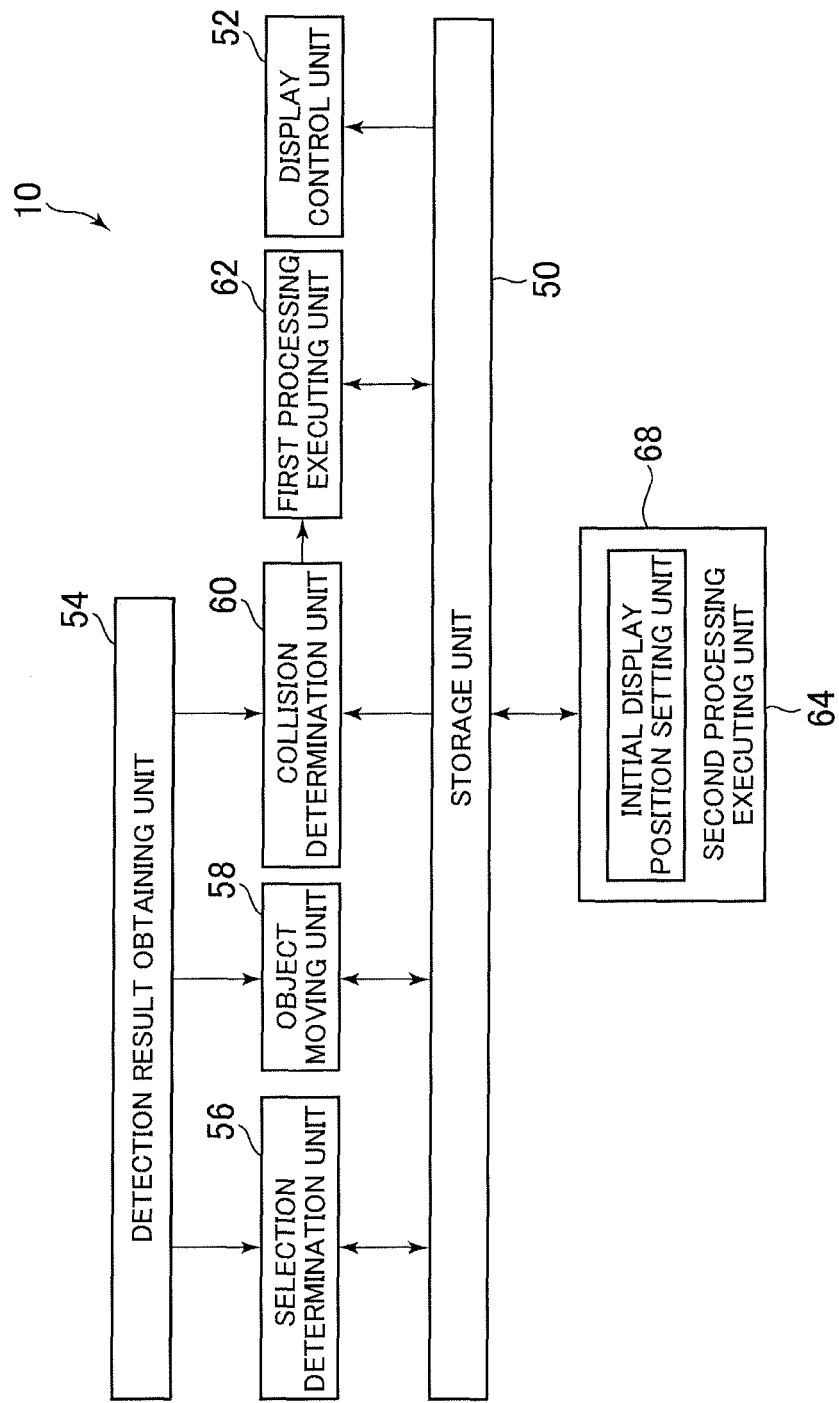
FIG. 22 is a functional block diagram of an information processing device according to a second embodiment.

FIG. 22 is a functional block diagram showing a functional block relevant to the present invention among those achieved in the information processing device 10 in the second embodiment. As shown in FIG. 22, the information processing device 10 in the second embodiment includes a storage unit 50, a display control unit 52, a detection result obtaining unit 54, a selection determination unit 56, an object moving unit 58, a collision determination unit 60, a first processing executing unit 62, and a second processing executing unit 64.

The information processing device 10 in the second embodiment differs from the first embodiment in that the initial display position setting unit 68 is included in the second processing executing unit 64 instead of the dominant hand determination unit 66. Thus, in the following, the second processing executing unit 64 and the initial display position setting unit 68 will be mainly described. Note that the functions of the other functional blocks are similar to those in the first embodiment, and thus not described again here.

Similar to the first embodiment, in the second embodiment as well, the second processing executing unit 64 executes predetermined processing, based on a positional relationship between the one object or the one designated position and the other object or the other designated position in a case in the past in which it is determined that the one designated position is included in the determination area corresponding to the one object among the plurality of objects and the other designated position is included in the determination area corresponding to the other object among the plurality of objects.

Note that, similar to the first embodiment, "positional relationship information" is direction information on a direction from "the one object or the one designated position" to "the other object or the other designated position" in a case in the past in which it is determined that the one designated position is included in the determination area corresponding to the one object and the other designated position is included in the determination area corresponding to the other object. In the second embodiment as well, for example, the history data shown in FIG. 13 is stored in the storage unit 50.

"Predetermined process" is processing for setting the initial display positions of a plurality of objects in a screen, for example. That is, the second processing executing unit 64 includes the initial display position setting unit 68. The initial display position setting unit 68 executes processing for setting the initial display positions of the plurality of objects in a screen based on the above described positional relationship information, to thereby set the initial display positions of the plurality of objects in the screen. In the second embodiment as well, similar to the first embodiment, as the favorite screen corresponds to the above described "screen", and the plurality of product images 22 correspond to "the plurality of objects", the initial display position setting unit 68 sets the initial display positions of the plurality of product images 22 displayed in the favorite screen based on the history data (FIG. 13).

Figures 23, 24:
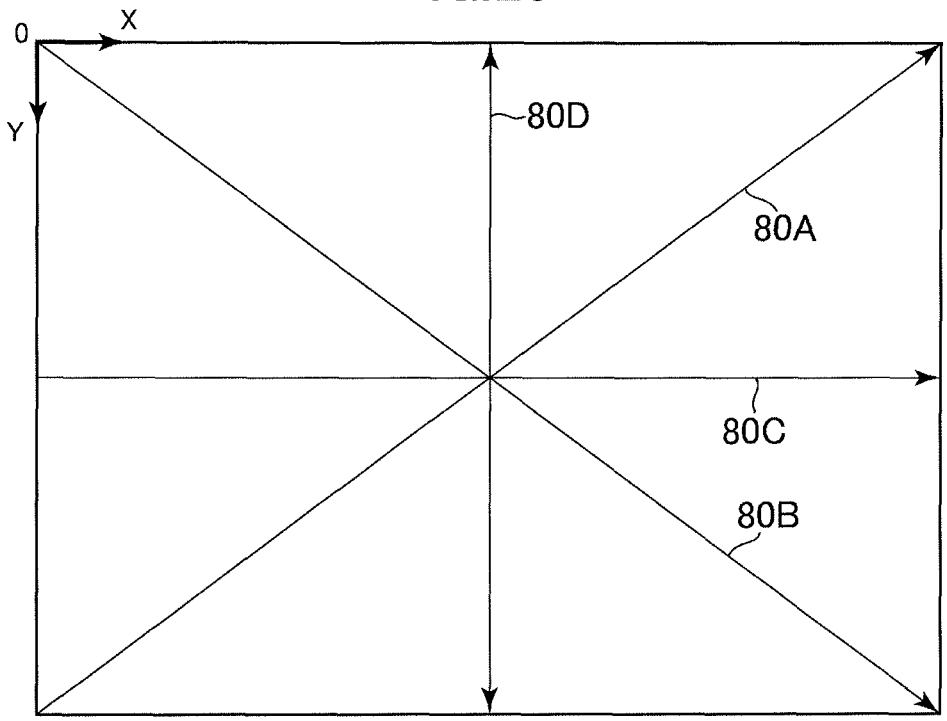
FIG. 23 is a diagram explaining initial display position data.
FIG. 24 shows another example of initial display position data.

In order to set the initial display position of the product image 22, based on the history data, data correlating the history data and the initial display position of the product image 22 is necessary. The data will be hereinafter referred to as "initial display position data". FIGS. 23 and 24 explain the initial display position data.

In this embodiment, a plurality of reference directions 80A, 80B, 80C, and 80D such as are shown in FIG. 23, for example, are virtually set in the favorite screen. The reference direction 80A is a direction extending from the lower left vertex of the favorite screen to the upper right vertex; the reference direction 80B is a direction extending from the upper left vertex of the favorite screen to the lower right vertex; the reference direction 80C is a direction extending from the left side of the favorite screen to the right side (that is, the x axial positive direction); the reference direction 80D is a direction extending in the up-down direction of the favorite screen (that is, the y axial positive or negative direction). Note that although four reference directions 80A to 80D are set here in the description, five or more reference directions may be set.

FIG. 24 shows one example of the initial position data. The initial position data shown in FIG. 24 correlates initial display positions of the product image 22 to the respective reference directions 80A to 80D. The respective reference directions A, B, C, and D shown in FIG. 24 correspond to the respective reference directions 80A, 80B, 80C, and 80D shown in FIG. 23. The respective areas A, B, C, and D shown in FIG. 24 correspond to the respective areas 90A, 90B, 90C, and 90D shown in FIG. 19. Further, respective boundaries A, B, C, and D shown in FIG. 24 correspond to the respective boundaries 92A, 92B, 92C, and 92D shown in FIG. 19.

Initially, the initial display position setting unit 68 obtains a combination of two product images 22 which a user highly likely collide. That is, the initial display position setting unit 68 obtains a combination of two products which a user highly likely selects as comparison targets. A method for obtaining a combination of two product images 22 which a user highly likely collide is similar to that in the first embodiment.

When two product images 22 which a user highly likely collide are obtained, the initial display position setting unit 68 sets the initial display positions of these two product images 22 based on the history data (FIG. 13). That is, the initial display position setting unit 68 sets the direction from the initial display position of one of the two product images 22 to that of the other based on the direction information included in the history data (FIG. 13). Specifically, the initial display position setting unit 68 sets the initial display positions of these two product images 22 such that the direction from one of the two product images 22 to that of the other coincides with the direction based on the direction information included in the history data (FIG. 13).

For example, as to each of the plurality of direction information items included in the history data (FIG. 13), the initial display position setting unit 68 determines whether or not the direction information corresponds to any of the reference directions 80A to 80D. Specifically, the initial display position setting unit 68 determines whether or not the angle formed by the direction indicated by the direction information and the reference direction is equal to or smaller than a reference angle, to thereby determine whether or not the direction information corresponds to the reference direction. For example, if the angle formed by the direction indicated by the direction information and the reference direction 80A is equal to or smaller than a reference angle, the initial display position setting unit 68 determines that the direction information corresponds to the reference direction 80A. If none of the angles formed by the direction indicated by the direction information and the respective reference directions 80A to 80D is equal to or smaller than a reference angle, the initial display position setting unit 68 determines that the direction information does not correspond to any of the reference directions 80A to 80D.

As to each of the reference directions 80A to 80D, the initial display position setting unit 68 obtains the number of direction information items corresponding to the reference direction. That is, the initial display position setting unit 68 obtains the number of direction information items corresponding to the reference direction 80A among the plurality of direction information items included in the history data (FIG. 13). Further, the initial display position setting unit 68 obtains the number of direction information items corresponding to the reference direction 80B among the plurality of direction information items included in the history data (FIG. 13). Similarly, the initial display position setting unit 68 obtains the number of direction information items corresponding to the reference direction 80C among the plurality of direction information items included in the history data (FIG. 13). Further, the initial display position setting unit 68 obtains the number of direction information items corresponding to the reference direction 80D among the plurality of direction information items included in the history data (FIG. 13). Then, the initial display position setting unit 68 obtains reference direction having the largest number of the above described direction information items from among the reference directions 80A to 80D.

Then, with reference to the initial display position data (FIG. 24), the initial display position setting unit 68 obtains the initial display position correlated to the reference direction having the largest number of the above described direction information items. For example, if the reference direction having the largest number of the above described direction information items is the reference direction 80B, the initial display position setting unit 68 obtains the areas 90A and 90D as the initial display positions. In this case, the initial display position setting unit 68 displays one of the two product images 22 which a user highly likely collide in the area 90A and the other in the area 90D.

Assume here a case in which the product images 22A to 22D shown in FIG. 3 are displayed in the favorite screen. In this case, as the product images 22B and 22C belong to the same product category (that is, socks) and are priced similar, the product image 22B, 22C are determined as two product images 22 which a user highly likely collide.

For example, if the reference direction having the largest number of the above described direction information items is the reference direction 80B, the initial display position of one of the product images 22B and 22C is set in the area 90A and that of the other in the area 90D, as shown in FIG. 21, for example. In this case, for example, either of the product images 22B and 22C is selected at random as a product image 22 to be initially displayed in the area 90A. Then, the product image 22 not selected as a product image 22 to be initially displayed in the area 90A is selected as a product image 22 to be initially displayed in the area 90D.

In the example shown in FIG. 21, the product image 22B is selected as a product image 22 to be initially displayed in the area 90A, and the product image 22C is selected as a product image 22 to be initially displayed in the area 90D. Note that, in this case, a position in the area 90A at which to initially display the product image 22B is determined at random. Similarly, a position in the area 90D at which to initially display the product image 22C is determined at random. Orientations of the product images 22B and 22C are also determined at random.

Note that the initial display positions of the product images 22A and 22D, not determined as product images 22 which a user highly likely collide, are set in the areas 90B and 90C other than the areas 90A and 90D, respectively. In this case, positions in the areas 90B and 90C are determined at random as the initial display positions of the product images 22A and 22D. Orientations of the product images 22A and 22D are also determined at random.

Note that, for example, when the reference direction having the largest number of the above described direction information items is the reference direction 80C, the initial display position setting unit 68 obtains the boundaries 92A and 92D as the initial display positions. In this case, the initial display position setting unit 68 shows one of the two product images 22 which a user highly likely collide on the boundary 92A and the other in the boundary 92D.

With the above, it is possible to assist a user to readily collide the product images 22 by considering the user's habit. That is, it is possible to assist a user to readily select two products as comparison targets.

According to the above described information processing device 10 in the second embodiment, it is possible to enhance user convenience by considering a user's habit without imposing on the user a task of inputting information on the user's habit.

Note here that in setting the initial display position of the product image 22, distance information (positional relationship information) on the distance between two product images 22 at a moment in the past at which it is determined that the two product images 22 are selected by a user may be considered. This distance information may be information on the distance between one designated position and the other designated position. Alternatively, the distance information may be information on the distance between the representative position of one object and a designated position corresponding to the other object (that is, a designated position determined as being included in the determination area corresponding to the other object), or information on the distance between a designated position corresponding to one object and the representative position of the other object.

In the following, an example will be described in which the initial display position of the product image 22 is set in consideration of the above-described distance information. In the following, two examples will be described.

Initially, a first example will be described. For example, if the distance between two product images 22 at a moment in the past at which it is determined that the two product images 22 are selected by a user is large, it is highly likely that the user selects one product image 22 with his/her right hand finger and the other product image 22 with his/her left hand finger. As the display position setting unit 68 is a functional block for setting the initial display position of the product image 22 so that a user can readily collide two product images 22 through a pinching operation using two fingers of his/her one hand, it is not desirable to use the above described direction information in the above described case in setting the initial display position of the product image 22. Thus, the initial display position setting unit 68 may not use the above described direction information in the above described case in setting the initial display position of the product image 22.

In order not to use the above described direction information in the above described case in setting the initial display position of the product image 22, the above described direction information in the above described case may not be included in the history data (FIG. 13), for example. Alternatively, history data shown in FIG. 18 may be stored instead of the history data shown in FIG. 13. In this case, direction information correlated to distance information indicating a distance larger than a reference distance may be ignored in setting the initial display position of the product image 22.

A second example will be described. The initial display position setting unit 68 may use the above described direction information and the above described distance information in setting the initial display position of the product image 22. For example, in setting the initial display positions of two product images 22 which a user highly likely collide, the initial display position setting unit 68 may set the distance between the initial display positions of these two product images 22 based on the distance information. Specifically, the initial display position setting unit 68 may set the initial display positions of these two product images 22 such that the distance between the initial display positions of these two product images 22 becomes a distance based on the above described distance information.

In order to implement such an operation of the initial display position setting unit 68, for example, history data such as is shown in FIG. 18 needs to be stored in the storage unit 50. Note that, in this case, the direction information need not be stored so as to be correlated to the distance information, and data indicating the history of the direction information may be stored separately from data indicating the history of the distance information.

Then, the initial display position setting unit 68 may calculate a statistic (for example, the average value, an intermediate value, or the like) of the distances indicated by a plurality of respective distance information items included in the history data (FIG. 18). Alternatively, the initial display position setting unit 68 may set the distance between the initial display positions of two product images 22 which a user highly likely collide, based on the above described statistic. For example, the initial display position setting unit 68 may set the initial display positions of these two product images 22 such that the distance between the initial display positions of these two product images 22 which a user highly likely collide becomes the above described statistic.

Note that the present invention is not limited to the above described first and second embodiments.

[1] For example, although a case in which an application program for searching for a product is executed in the information processing device 10 is described in the above, an application program for searching for information other than a product may be executed in the information processing device 10.

Further, although a case in which information to be searched for is stored in the database 6 is described in the above, information to be searched for may be stored in the auxiliary storage unit 13 of the information processing device 10. In this case, the information processing device 10 obtains a list of information items satisfying a search condition from the auxiliary storage unit 13.

[2] Further, for example, although a case in which the present invention is applied to an information processing device 10 for displaying a plurality of product images 22 in a screen (a favorite screen) is described in the above, the present invention can be applied to an information processing device for displaying an object other than the product image 22 in a screen.

[2-1] For example, the present invention can be applied to an information processing device for displaying a plurality of icons (objects) each correlated to a file or a folder in a screen.

Note that in the information processing device in this case, when a user has collided icons, the files (folders) correlated to the two respective icons may be unified. Alternatively, a difference between the files (folders) correlated to the two respective icons may be displayed. Alternatively, a file (folder) correlated to one icon may be overwritten by a file (folder) correlated to the other icon. Still alternatively, the files (folders) correlated to the two respective icons may be erased. If image data is correlated to an icon, image data obtained by combining image data items correlated to two respective icons in collision may be displayed.

[2-2] Further, for example, the present invention can be applied to an information processing device (game device) for displaying a plurality of game characters (objects) in a game screen.

That is, in the image processing device (game device) in this case, when a user collides game characters in the game screen, a comparison screen for comparing parameter information items (attribute information) of these game characters may be displayed. Alternatively, the game characters may talk with each other. Further alternatively, these game characters may fight. In a case in which game characters are caused to fight against each other when a user collides the game characters, a winner and a lower may be determined by comparing the parameter information items (attribute information) of these game characters. Then, a winner game character may be left in game screen, while a loser game character may disappear from the game screen. Note that the loser game character may move to an end of the game screen.

[2-3] Further, the present invention can be applied to an image processing device for displaying a plurality of icons (objects) correlated to raw materials (materials) in a screen (recipe search screen).

That is, if a user collides icons in the recipe search screen, a menu which can be made using the materials correlated to these icons may be searched for, and a recipe of the menu may be displayed.

[3] It is described in the above that two objects are movable when being pointed out by a user with his/her two fingers. That is, one object moves in accordance with movement of one finger, and the other object moves in accordance with movement of the other finger.

However, only one of the two objects pointed out by a user with his/her two fingers may be movable. In this case, for example, only the object first pointed out by the user may be movable, or only the object second pointed out by the user may be movable.

Here, assume a case of an example shown in FIGS. 4, 10, and 11, for example. Further, assume a case in which only the product image 22 first pointed out by a user is movable. In this case, if the user points out the product image 22C prior to the product image 22B, the user can move only the product image 22C. In this case, the user moves the finger pointing out the product image 22C toward the finger pointing out the product image 22B, whereby the product image 22C is made colliding against the product image 22B.

[4] For example, the screen displayed on the display unit 15 may be generated using a 3D computer graphics technique. For example, a screen showing a picture of a 3D space where a plurality of objects is placed viewed from a virtual camera may be displayed on the display unit 15.

[5] For example, the designation unit (operating unit 14) for use by a user to designate a position in a screen displayed on the display unit 15 may not be provided overlapping the display unit 15, but apart from the display unit 15.

The invention claimed is:
1. An information processing device, comprising:
at least one processor operable to read and operate according to instructions within a computer program; and
at least one memory operable to store at least portions of said computer program for access by said processor;

wherein said program includes algorithms to cause said processor to implement:

display control means for displaying a screen including a plurality of objects on display means;

detection result obtaining means for obtaining a result of detection by detection means capable of detecting a plurality of positions in the screen designated by a user;

determination means for determining whether or not a designated position of the user is included in a determination area of any object among the plurality of objects, wherein the determination area is an area that is set for determining whether the user selects an object;

object moving means, in a case where it is determined that a first designated position of the user is included in a determination area of a first object among the plurality of objects and that a second designated position of the user is included in a determination area of a second object among the plurality of objects, for moving at least one of the first object and the second object in accordance with a pinching operation, the pinching operation is performed in at least one of a direction from the first object or the first designated position to the second object or the second designated position, and a direction from the second object or the second designated position to the first object or the first designated position;

collision determination means, in a case where it is determined that the first designated position is included in the determination area of the first object and that the second designated position is included in the determination area of the second object, and at least one of the first object and the second object is moved by the pinching operation through the object moving means, for determining whether or not the first object and the second object collide with each other;

first processing executing means for executing processing relevant to the first object and the second object based on a result of determination by the collision determination means; and second processing executing means for executing predetermined processing based on history data, said history data comprising a plurality of positional relationship information items, each positional relationship information item including information on a positional relationship between the first object or the first designated position and the second object or the second designated position in a case in which it is previously determined that the first designated position is included in the determination area of the first object and that the second designated position is included in the determination area of the second object, wherein the predetermined processing comprises at least one of setting initial display positions of the plurality of objects displayed on the screen based on the history data and determining a dominant hand of the user based on the history data, the history data including direction information on at least one of the direction from the first object or the first designated position to the second object or the second designated position and the direction from the second object or the second designated position to the first object or the first designated position according to a direction in which the pinching operation is performed.

2. The information processing device according to claim 1, wherein the positional relationship is a positional relationship between the first object or the first designated position and the second object or the second designated position in a case in which it is previously determined that the first object and the second object collide with each other.

3. The information processing device according to claim 1, wherein
attribute information is correlated to each of the plurality of objects, and
the display control means includes
comparing means for comparing attribute information items of two objects among the plurality of objects to determine two objects having a higher probability of being selected by the user and collided with each other, and
means for setting initial display positions of the determined two objects, based on a result of the determining the dominant hand of the user.

4. The information processing device according to claim 1, further comprising means for storing in storage means information on a combination of two objects that are determined by the collision determination means as having collided with each other,
wherein the display control means includes means for setting initial display positions of two objects selected from among the plurality of objects based on at least a part of content stored in the storage means, based on a result of the determining the dominant hand of the user.

5. The information processing device according to claim 1, further comprising:
means for obtaining a list of information satisfying a search condition, and
means for displaying a search result screen showing the list of information on the display means,
wherein the search condition is set based on a result of the determining the dominant hand of the user.

6. The information processing device according to claim 1, wherein
the positional relationship information item includes direction information on a direction from the first object or the first designated position to the second object or the second designated position in a case in which it is previously determined that the first designated position is included in the determination area the first object and the second designated position is included in the determination area of the second object,
attribute information is correlated to each of the plurality of objects, and
the second processing executing means includes
comparing means for comparing attribute information items of two objects among the plurality of objects to determine two objects having a higher probability of being selected by the user and collided with each other, and
means for setting a direction from an initial display position of one of the determined two objects, based on the direction information.

7. The information processing device according to claim 1, the positional relationship information item includes distance information on a distance between the first object or the first designated position and the second object or the second designated position in a case in which it is previously determined that the first designated position is included in the determination area of the first object and the second designated position is included in the determination area of the second object,
attribute information is correlated to each of the plurality of objects, and the second processing executing means includes
comparing means for comparing attribute information items of two objects among the plurality of objects to determine two objects having a higher probability of being selected by the user and collided with each other, and
means for setting a distance between initial display positions of the determined two objects, based on the distance information.

8. The information processing device according to claim 1, wherein
the positional relationship information item includes direction information on a direction from the first object or the first designated position to the second object or the second designated position in a case in which it is previously determined that the first designated position is included in the determination area of the first object and the second designated position is included in the determination area of the second object,
the information processing device further comprises means for storing in storage means information on a combination of two objects that are determined by the collision determination means as having been collided with each other, and
the second processing executing means includes means for setting a direction from an initial display position of first of two objects selected from among the plurality of objects based on at least a part of content stored in the storage means, to an initial display position of the second of the two objects, based on the direction information.

9. The information processing device according to claim 1, the positional relationship information item includes distance information on a distance between the first object or the first designated position and the second object or the second designated position in a case in which it is previously determined that the first designated position is included in the determination area of the first object and the second designated position is included in the determination area of the second object,
the information processing device further comprises means for storing in storage means information on a combination of two objects that are determined by the collision determination means as having been collided with each other, and
the second processing executing means includes means for setting a distance between initial display positions of two objects selected from among the plurality of objects based on at least a part of content stored in the storage means, based on the distance information.

10. A control method for an information processing device, the control method comprising:
displaying a screen including a plurality of objects on display means;
obtaining a result of detection by detection means capable of detecting a plurality of positions in the screen designated by a user;
determining whether or not a designated position of the user is included in a determination area of any object among the plurality of objects, wherein the determination area is an area that is set for determining whether the user selects an object;
moving, in a case where it is determined that a first designated position of the user is included in a determination area of a first object among the plurality of objects and that a second designated position of the user is included in a determination area of a second object among the plurality of objects, at least one of the first object and the second object in accordance with a pinching operation, the pinching operation is performed in at least one of a direction from the first object or the first designated position to the second object or the second designated position, and a direction from the second object or the second designated position to the first object or the first designated position;
determining, in a case where it is determined that the first designated position is included in the determination area of the first object and that the second designated position is included in the determination area of the second object, and at least one of the first object and the second object is moved by the pinching operation at the moving, of determining whether or not the first object and the second object collide with each other;
executing processing relevant to the first object and the second object based on a result of the determining; and
executing predetermined processing based on history data, said history data comprising a plurality of positional relationship information items, each positional relationship information item including information on a positional relationship between the first object or the first designated position and the second object or the second designated position in a case in which it is previously determined that the first designated position is included in the determination area of the first object and that the second designated position is included in the determination area of the second object,
wherein the predetermined processing comprises at least one of setting initial display positions of the plurality of objects displayed on the screen based on the history data and determining a dominant hand of the user based on the history data, the history data including direction information on at least one of the direction from the first object or the first designated position to the second object or the second designated position and the direction from the second object or the second designated position to the first object or the first designated position according to a direction in which the pinching operation is performed.

11. A non-transitory computer readable information storage medium storing a program for causing a computer,
wherein said computer comprises at least one processor operable to read and operate according to instructions within said program, and at least one memory operable to store at least portions of said program for access by said processor, and
wherein said program includes algorithms to cause said processor to function as:
display control means for displaying a screen including a plurality of objects on display means;
detection result obtaining means for obtaining a result of detection by detection means capable of detecting a plurality of positions in the screen designated by a user;
determination means for determining whether or not a designated position of the user is included in a determination area of any object among the plurality of objects, wherein the determination area is an area that is set for determining whether the user selects an object;
object moving means, in a case where it is determined that a first designated position of the user is included in a determination area of a first object among the plurality of objects and that a second designated position of the user is included in a determination area of a second object among the plurality of objects, for moving at least one of the first object and the second object in accordance with a pinching operation, the pinching operation is performed in at least one of a direction from the first object or the first designated position to the second object or the second designated position, and a direction from the second object or the second designated position to the first object or the first designated position;

collision determination means, in a case where it is determined that the first designated position is included in the determination area of the first object and that the second designated position is included in the determination area of the second object, and at least one of the first object and the second object is moved by the pinching operation through the object moving means, for determining whether or not the first object and the second object collide with each other;

first processing executing means for executing processing relevant to the first object and the second object based on a result of determination by the collision determination means; and second processing executing means for executing predetermined processing based on history data, said history data comprising a plurality of positional relationship information items, each positional relationship information item including information on a positional relationship between the first object or the first designated position and the second object or the second designated position in a case in which it is previously determined that the first designated position is included in the determination area of the first object and that the second designated position is included in the determination area of the second object, wherein the predetermined processing comprises at least one of setting display positions of the plurality of objects displayed on the screen based on the history data and determining a dominant hand of the user based on the history data, the history data including direction information on at least one of the direction from the first object or the first designated position to the second object or the second designated position and the direction from the second object or the second designated position to the first object or the first designated position according to a direction in which the pinching operation is performed.

* * * * *